United States Patent
Shikanai et al.

(10) Patent No.: US 12,151,761 B2
(45) Date of Patent: Nov. 26, 2024

(54) KNUCKLE GUARD

(71) Applicant: HONDA MOTOR CO., LTD., Tokyo (JP)

(72) Inventors: Shimpei Shikanai, Wako (JP); Ryuichi Nakanishi, Wako (JP); Jumpei Yasuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 779 days.

(21) Appl. No.: 17/270,061

(22) PCT Filed: Apr. 1, 2019

(86) PCT No.: PCT/JP2019/014432
§ 371 (c)(1),
(2) Date: Feb. 22, 2021

(87) PCT Pub. No.: WO2020/066079
PCT Pub. Date: Apr. 2, 2020

(65) Prior Publication Data
US 2021/0323627 A1    Oct. 21, 2021

(51) Int. Cl.
*B62J 23/00* (2006.01)
*B62J 27/00* (2020.01)
*B62K 11/14* (2006.01)

(52) U.S. Cl.
CPC .............. *B62J 23/00* (2013.01); *B62J 27/00* (2013.01); *B62K 11/14* (2013.01)

(58) Field of Classification Search
CPC ............ B62J 23/00; B62J 27/00; B62K 11/14
USPC ....................................... 280/304.3
See application file for complete search history.

(56) References Cited

U.S. PATENT DOCUMENTS

| 2008/0203762 A1 | 8/2008 | Shimanski |
| 2016/0031510 A1 | 2/2016 | Serbinski |
| 2016/0311490 A1 | 10/2016 | Degarate |

FOREIGN PATENT DOCUMENTS

| JP | 64-037785 | 3/1989 | |
| JP | 10-218059 | 8/1998 | |
| JP | 2014-069596 | 4/2014 | |
| WO | WO-2012127070 A1 * | 9/2012 | .............. B62J 23/00 |

OTHER PUBLICATIONS

German Office Action for German Patent Application No. 112019004872.4 mailed Mar. 22, 2022.
International Search Report and Written Opinion for International Application No. PCT/JP2019/014432 mailed on Jun. 18, 2019, 7 pages.

* cited by examiner

*Primary Examiner* — Kevin Hurley
*Assistant Examiner* — Felicia L. Brittman
(74) *Attorney, Agent, or Firm* — Amin, Turocy & Watson, LLP

(57) ABSTRACT

A knuckle guard (30) according to an embodiment includes a wind guide portion (35) that is disposed in front of a grip (17) of a handlebar (15) of a vehicle (1) and has a communication hole (36) which opens in a vertical direction, wherein the wind guide portion (35) covers the communication hole (36) in a front view.

9 Claims, 25 Drawing Sheets

KNUCKLE GUARD

TECHNICAL FIELD

The present invention relates to a knuckle guard.

Priority is claimed on Patent Application No. PCT/JP2018/36397, filed Sep. 28, 2018, the content of which is incorporated herein by reference.

BACKGROUND ART

For example, in Patent Document 1, a structure in which a wind guide path having a concave groove shape is provided in a knuckle guard that covers the front of the hands (the knuckle portion) of a rider to reduce the wind on the rider and maintain driving comfort is disclosed. In a front view, the knuckle guard is provided with a vent hole that opens toward a handlebar.

RELATED ART DOCUMENT

Patent Document

Patent Document 1: Japanese Unexamined Patent Application, First Publication No. 2014-69596

SUMMARY

Problems to be Solved by the Invention

However, since the vent hole opens toward the handlebar, windproof, mud-proof, gravel-proof, and branch-proof effects with respect to the knuckle portion and the arm portion of the rider may be impaired.

Therefore, the present invention provides a knuckle guard capable of suppressing impairment of windproof, mud-proof, gravel-proof, and branch-proof effects during travel.

Means for Solving the Problem

An aspect of the present invention is a knuckle guard (30) including a wind guide portion (35) that is disposed in front of a grip (17) of a handlebar (15) of a vehicle (1) and has a communication hole (36) which opens in a vertical direction, wherein the wind guide portion (35) covers the communication hole (36) in a front view.

According to this configuration, the wind guide portion covers the communication hole in the front view, and thus the present embodiment does not have an opening in a forward direction of the vehicle. Therefore, it is possible to protect the knuckle portion and the arm portion of the rider from wind, water, mud, gravel, branches, and the like during travel with the wind guide portion. Therefore, it is possible to suppress impairment of windproof, mud-proof, gravel-proof, and branch-proof effects during travel. In addition, by providing the wind guide portion that is disposed in front of the grip of the handlebar of the vehicle and has the communication hole which opens in the vertical direction, it is possible to correct a negative pressure behind the knuckle guard with the communication hole. Therefore, it is possible to obtain a larger windproof effect with a smaller front projection area. In addition, since the communication hole cannot be seen from the front, it creates a sense of unity with the knuckle guard and is excellent in design.

In an aspect of the present invention, the knuckle guard (30) may include a first protective member (31) disposed in front of the grip (17) and a second protective member (32) disposed in front of the first protective member (31), the first protective member (31) and the second protective member (32) may form a stacked portion (37) in which the protective members overlap each other, and the communication hole (36) may open to at least a part of the stacked portion (37) in the vertical direction.

According to this configuration, since the knuckle guard has a divided structure and the communication hole is formed by the stacked portion of the divided components (the first protective member and the second protective member), the knuckle guard is suppressed to have a complicated structure and the knuckle guard is easily formed.

In an aspect of the present invention, the first protective member (31) may have an attachment hole (44a) for attaching the second protective member (32), the attachment hole (44a) may be an elongated hole having a length in a vehicle width direction, and the second protective member (32) may be able to enlarge the communication hole (36) by being bent inward in the vehicle width direction along the attachment hole (44a).

According to this configuration, when the second protective member is bent inward in the vehicle width direction and is fixed to the inward side of the attachment hole of the first protective member in the vehicle width direction, the communication hole (the gap) of the stacked portion is enlarged, and thus it is possible to adjust the wind amount flowing rearward from the knuckle guard (the wind amount for correcting the negative pressure behind the knuckle guard). Therefore, it is easy to adjust the windproof range and the wind amount behind the knuckle guard according to the rider's preference, in consideration of the traveling conditions such as the traveling speed and the air temperature (including the ambient temperature of the hands).

In an aspect of the present invention, the first protective member (31) may have an insertion hole (43a) which is an elongated hole having a length in the vehicle width direction, and a positioning portion (74) that defines a position in the insertion hole (43a) may be provided between the first protective member (31) and the second protective member (32).

According to this configuration, it is possible to define a relative position between the first protective member and the second protective member.

In an aspect of the present invention, the second protective member (32) may be provided with an engaging claw (74) as the positioning portion (74) which can be inserted into the insertion hole (43a) of the first protective member (31), the engaging claw (74) may have an L shape that extends diagonally rearward and outward from a rear surface of the second protective member (32), in an initial state before the second protective member (32) is bent, the engaging claw (74) may engage with an opening edge portion of the insertion hole (43a) of the first protective member (31), and in a state in which the second protective member (32) is bent to form a curved shape that projects forward, the engaging claw (74) may come into contact with a stepped portion (76) on a front surface of the first protective member (31).

According to this configuration, it is possible to define a relative position between the first protective member and the second protective member in each of the initial state and the curved state of the second protective member.

In an aspect of the present invention, the second protective member (32) may be attachable to and detachable from the first protective member (31).

According to this configuration, by removing the second protective member from the first protective member, it is possible to use the knuckle guard with only the first protective member. For example, during long-distance travel or off-road travel, the second protective member is attached to the first protective member for travel. For example, during low-speed travel or on-road travel in an urban area, the vehicle travels with only the first protective member. For example, when the temperature is low, the second protective member is attached to the first protective member for travel. For example, when the temperature is high, the vehicle travels with only the first protective member. In this way, the specifications of the knuckle guard can be changed according to the conditions, and thus the degree of freedom in changing the specifications is improved. In addition, the specifications can be changed by adding only a part of the component without replacing the whole knuckle guard with another component, and thus the cost of the component is reduced. In addition, in a case in which the first protective member has the attachment hole for attaching the second protective member, the attachment hole can function as a wind guide hole.

An aspect of the present invention may further include an opening adjusting structure (170) for adjusting an opening area of the communication hole (36), wherein the opening adjusting structure (170) includes an elastic convex portion (173) that protrudes rearward from the second protective member (32) and is elastically deformable, an attachment hole (44a) that is an elongate hole provided on the first protective member (31) and having a length in a vehicle width direction and is for attaching the elastic convex portion (173), and a fastening member (172) that fastens the first protective member (31) and the second protective member (32) to each other by elastically deforming the elastic convex portion (173).

According to this configuration, when the second protective member is bent inward in the vehicle width direction and is fixed to the inward side of the attachment hole of the first protective member in the vehicle width direction by the elastic convex portion being elastically deformed, it is possible to enlarge the communication hole, and it is possible to increase the wind amount flowing rearward from the knuckle guard through the communication hole. On the other hand, when the second protective member is fixed to the outward side of the attachment hole of the first protective member in the vehicle width direction by the elastic convex portion being elastically deformed, it is possible to reduce the communication hole, and it is possible to decrease the wind amount flowing rearward from the knuckle guard through the communication hole. Therefore, it is easy to adjust the windproof range and the wind amount behind the knuckle guard according to the rider's preference, in consideration of the traveling conditions such as the traveling speed and the air temperature (including the ambient temperature of the hands).

In an aspect of the present invention, the opening adjusting structure (170) may further include a windproof convex portion (171) that is provided between the first protective member (31) and the second protective member (32) and blocks at least some of the wind that has entered the communication hole (36).

According to this configuration, at least some of the wind that has entered the communication hole is blocked by the windproof convex portion, and thus it is possible to reduce the wind amount flowing rearward from the knuckle guard through the communication hole.

In an aspect of the present invention, the attachment hole (44a) may be provided in an outward portion of the first protective member (31) in a vehicle width direction, and the windproof convex portion (171) may protrude rearward from the second protective member (32) and extend continuously in the vehicle width direction from an outward portion of the second protective member (32) in the vehicle width direction to an inward portion of the second protective member (32) in the vehicle width direction.

According to this configuration, it is easy to reduce the wind amount flowing rearward from the knuckle guard through the communication hole as compared with the case in which the plurality of windproof convex portions are disposed at intervals in the vehicle width direction. In addition, in a case in which the second protective member is attachable to and detachable from the first protective member, it is possible to enhance the appearance of the first protective member with the second protective member removed from the first protective member (when the knuckle guard is used with only the first protective member) as compared with the configuration in which the windproof convex portion protrudes forward from the first protective member.

In an aspect of the present invention, in the opening adjusting structure (170), when the windproof convex portion (171) comes into contact with a front surface of the first protective member (31) in a state in which the elastic convex portion (173) is located at an outward end portion of the attachment hole (44a) in the vehicle width direction, the communication hole (36) may be able to be closed.

According to this configuration, when the second protective member is fixed to the outward end portion of the attachment hole of the first protective member in the vehicle width direction by the elastic convex portion being elastically deformed, it is possible to close the communication hole, and it is possible to prevent wind from passing through the communication hole. Therefore, it is possible to adjust the opening area of the communication hole according to the preference and the situation. In addition, by allowing the windproof convex portion to come into contact with the front surface of the first protective member, it is possible to suppress rattling between the first protective member and the second protective member.

In an aspect of the present invention, the opening adjusting structure (170) may further include the engaging claw (74) having an L shape that extends diagonally rearward and outward from a rear surface of the second protective member (32), an insertion hole (43a) that is an elongate hole provided in the first protective member (31) and having a length in the vehicle width direction and into which the engaging claw (74) can be inserted, an engaging protrusion (75) that is one edge of the insertion hole (43a) and with which the engaging claw (74) can engage in an initial state before the second protective member (32) is bent, a first stepped portion (176) that is a stepped portion provided on a front surface of the first protective member (31) and with which the engaging claw (74) can come into contact in a first curved state in which the second protective member (32) is bent to form a curved shape that projects forward, and a second stepped portion (177) that is a stepped portion provided forward from the first step portion (176) on the front surface of the first protective member (31) and with which the engaging claw (74) can come into contact in a second curved state in which the second protective member (32) is bent to form a curved shape that projects forward from the first curved state.

According to this configuration, it is possible to define a relative position between the first protective member and the second protective member in each of the initial state, the first curved state, and the second curved state of the second protective member. In addition, it is possible to adjust the wind amount flowing rearward from the knuckle guard through the communication hole in three stages of the initial state, the first curved state, and the second curved state of the second protective member.

Advantage of the Invention

According to the aspects of the present invention, it is possible to suppress impairment of windproof, mud-proof, gravel-proof, and branch-proof effects during travel.

DESCRIPTION OF THE EMBODIMENTS

Figure 1:
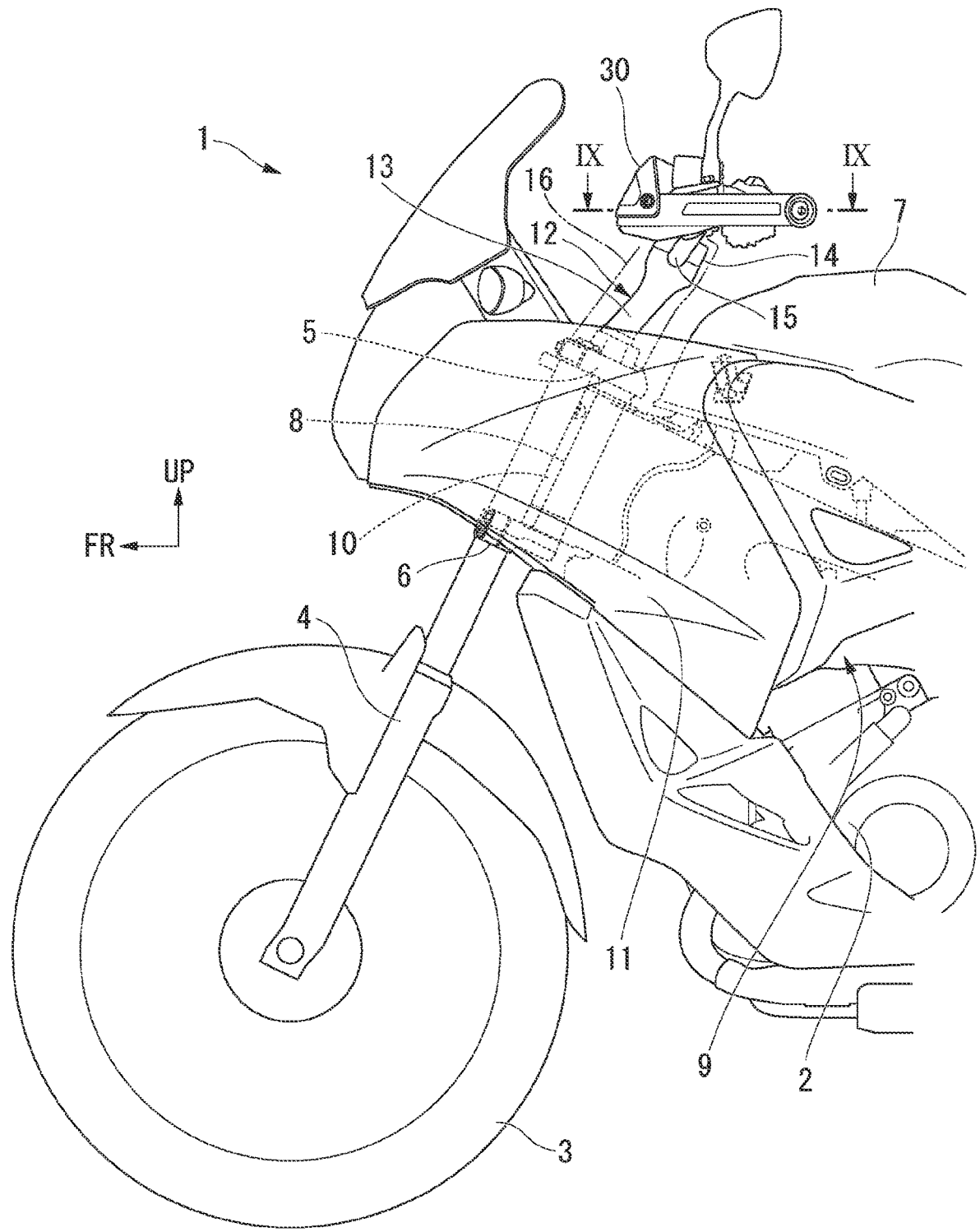
FIG. 1 is a left side view of a front part of a motorcycle according to a first embodiment.

Hereinafter, embodiments of the present invention will be described with reference to the drawings. Front, rear, left, and right directions in the following description are the same as directions in a vehicle described below unless otherwise specified. An arrow FR indicating a forward direction with respect to the vehicle, an arrow LH indicating a leftward direction with respect to the vehicle, and an arrow UP indicating an upward direction with respect to the vehicle are shown at appropriate places in the drawings used in the following description.

First Embodiment

<Whole Vehicle>

FIG. 1 shows, as an example of a saddle-ride type vehicle, a motorcycle 1. With reference to FIG. 1, in the motorcycle 1, an engine 2 is mounted substantially in the center of a vehicle body in a front-rear direction. Hereinafter, the motorcycle may simply be referred to as a "vehicle."

In the motorcycle 1, a front wheel 3 is disposed in front of the engine 2. The front wheel 3 is rotatably supported by a pair of left and right front forks 4. A top bridge 5 and a bottom bridge 6 are installed on an upper part of the front forks 4 in that order from the top. A fuel tank 7 is provided above the engine 2. A steering shaft 8 is installed vertically between the top bridge 5 and the bottom bridge 6 in an axial direction. The steering shaft 8 is rotatably supported by a head pipe 10 provided at a front end of a vehicle body frame 9. The periphery of the head pipe 10 is covered by a front cowl 11.

A handle holder 12 is provided on an upper surface of the top bridge 5. The handle holder 12 includes a lower holder 13 fixed to the upper surface of the top bridge 5 and an upper holder 14 attached to an upper part of the lower holder 13. A handlebar 15 is fixed to the handle holder 12 to be sandwiched between the lower holder 13 and the upper holder 14. For example, the handlebar 15 is made of a metal pipe body. The handlebar 15 is a bar handle in a longitudinal direction which is a vehicle width direction. Reference sign 16 in the drawing indicates a handle cover that covers the periphery of the handle holder 12.

Figure 2:
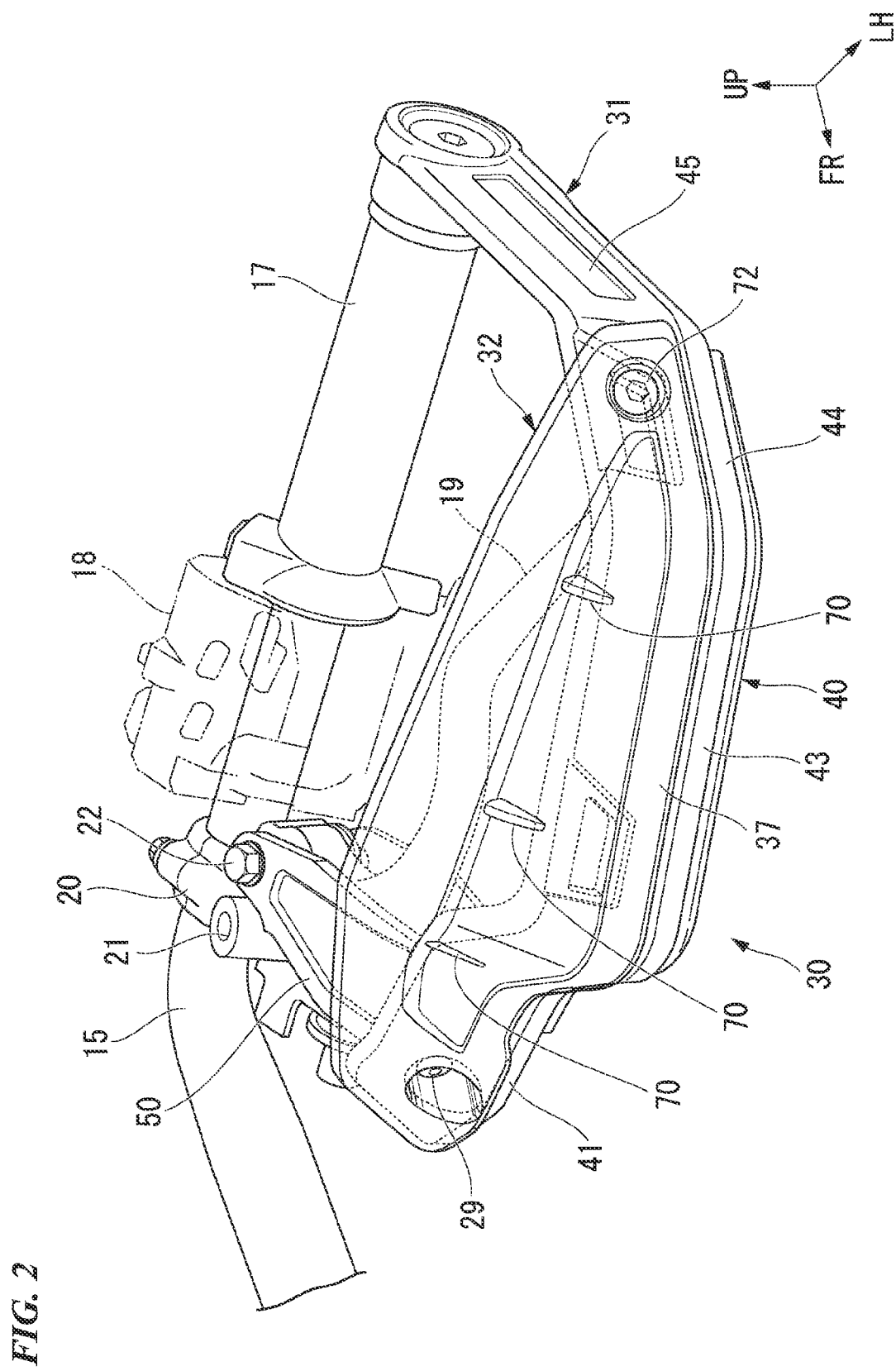
FIG. 2 is a perspective view of a knuckle guard according to the first embodiment from the front upper side.

As shown in FIG. 2, in an outward portion of the handlebar 15 in the vehicle width direction (a leftward side portion in the drawing), a tubular grip 17 made of a resin material is inserted into and attached to an outer side of the handlebar 15 in the vehicle width direction. In a portion of the handlebar 15 inward from the grip 17 in the vehicle width direction, a switch housing 18 (a two-dot chain line) in which various switches are accommodated is attached adjacent to the grip 17.

Figure 3:
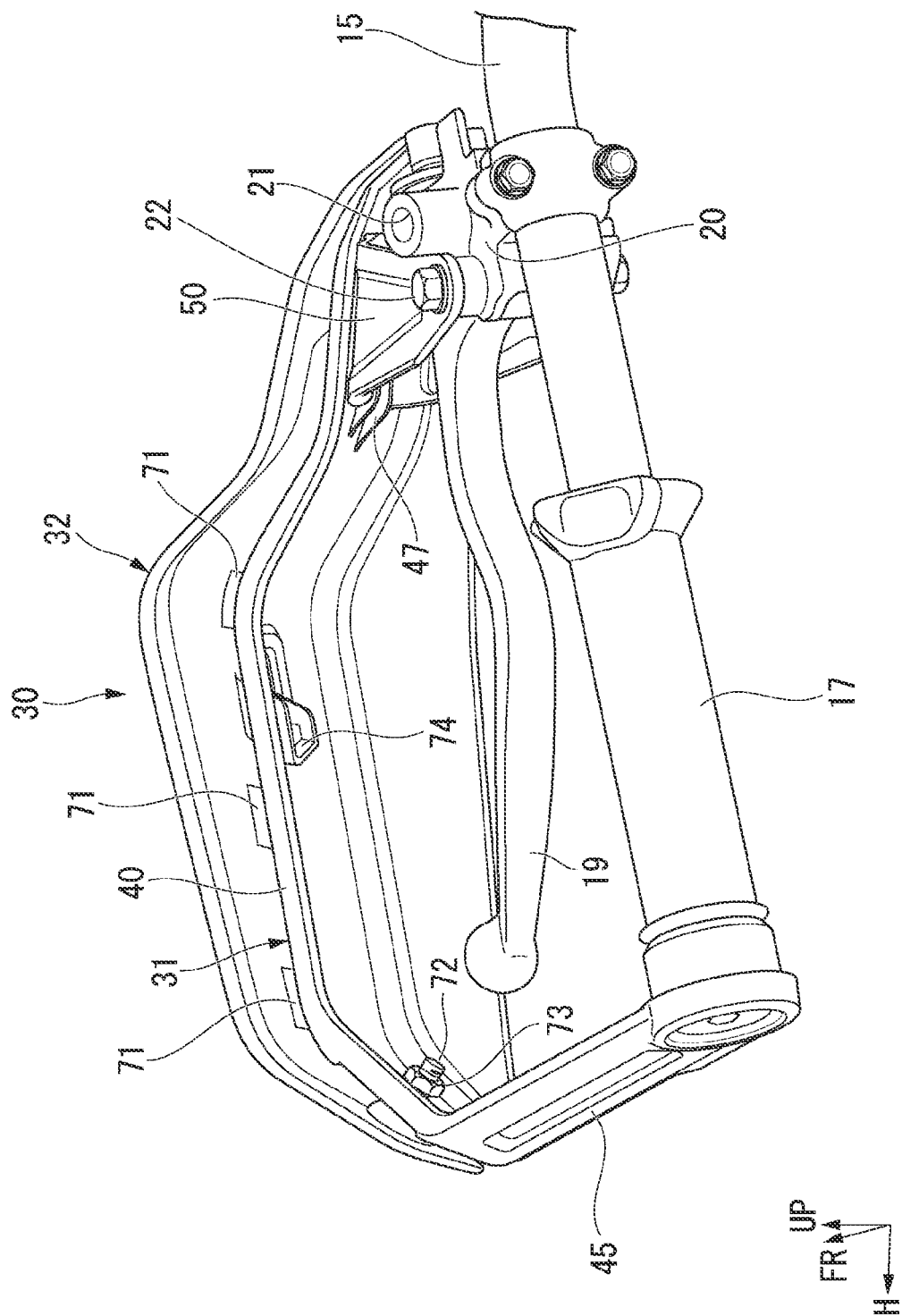
FIG. 3 is a perspective view of the knuckle guard according to the first embodiment from the rear upper side.

As shown in FIG. 3, a lever holder 20 that swingably supports a clutch lever 19 is provided in a portion of the handlebar 15 inward from the switch housing 18 (see FIG. 2) in the vehicle width direction. In FIG. 3, the switch housing 18 is not shown. Reference sign 21 in the drawing indicates an attachment portion of a side mirror. Although not shown, a brake lever is swingably supported on a right side portion of the handlebar 15.

<Knuckle Guard 30>

Figure 5:
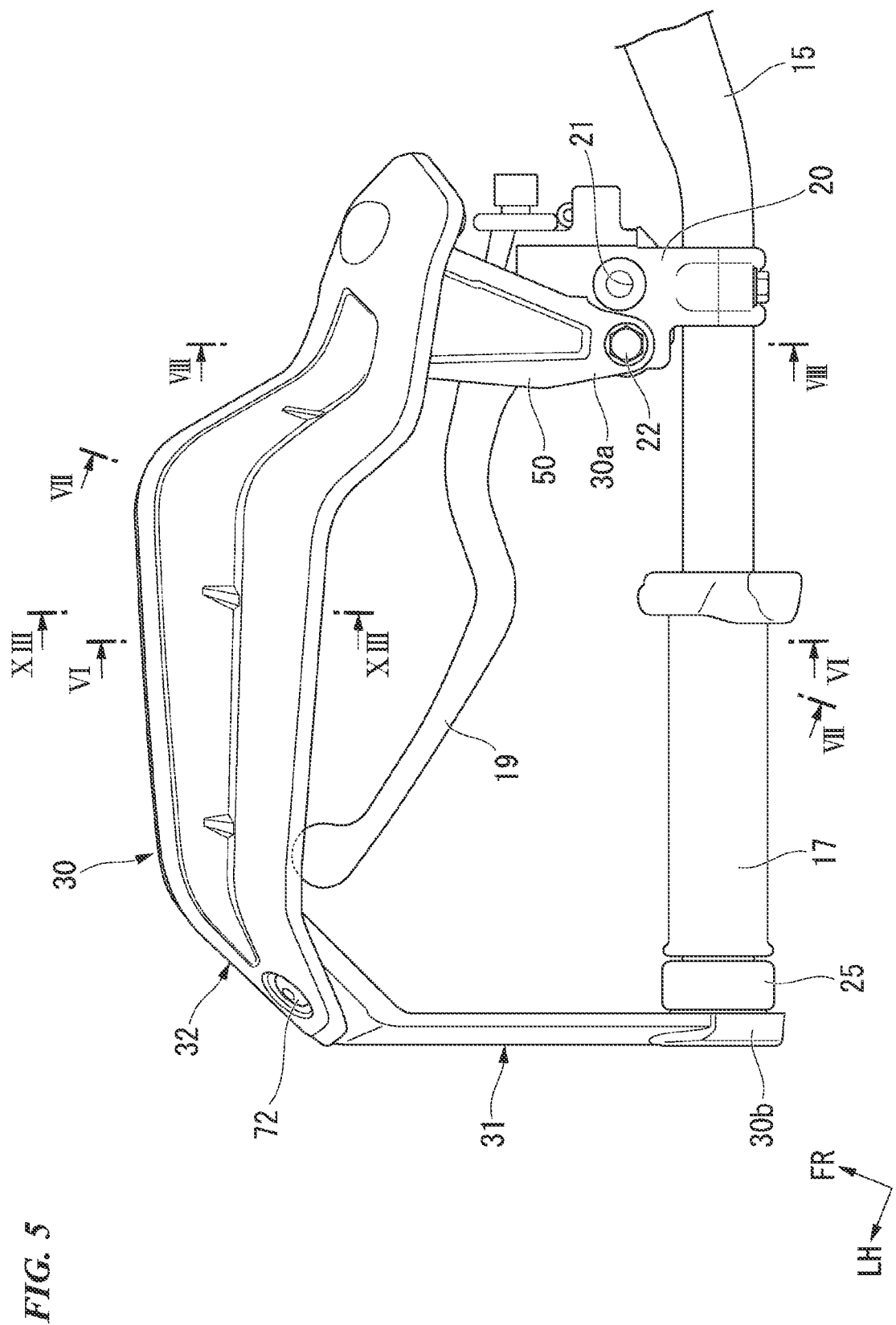
FIG. 5 is a top view of the knuckle guard according to the first embodiment.

As shown in FIG. 5, a knuckle guard 30 is disposed in front of the grip 17 to cover the grip 17 and the handlebar 15. For example, the knuckle guard 30 is made of a resin.

The knuckle guard 30 covers the front of the hand of an occupant when the occupant grips the grip 17. In a top view, the knuckle guard 30 has a U-shape that opens rearward.

The lever holder 20 also serves as a fastening holder for fixing an inward end portion 30a of the knuckle guard 30. The inward end portion 30a of the knuckle guard 30 is fastened by a bolt 22 and a collars 23 that form a swing shaft of the clutch lever 19 (see FIG. 8).

Figure 9:
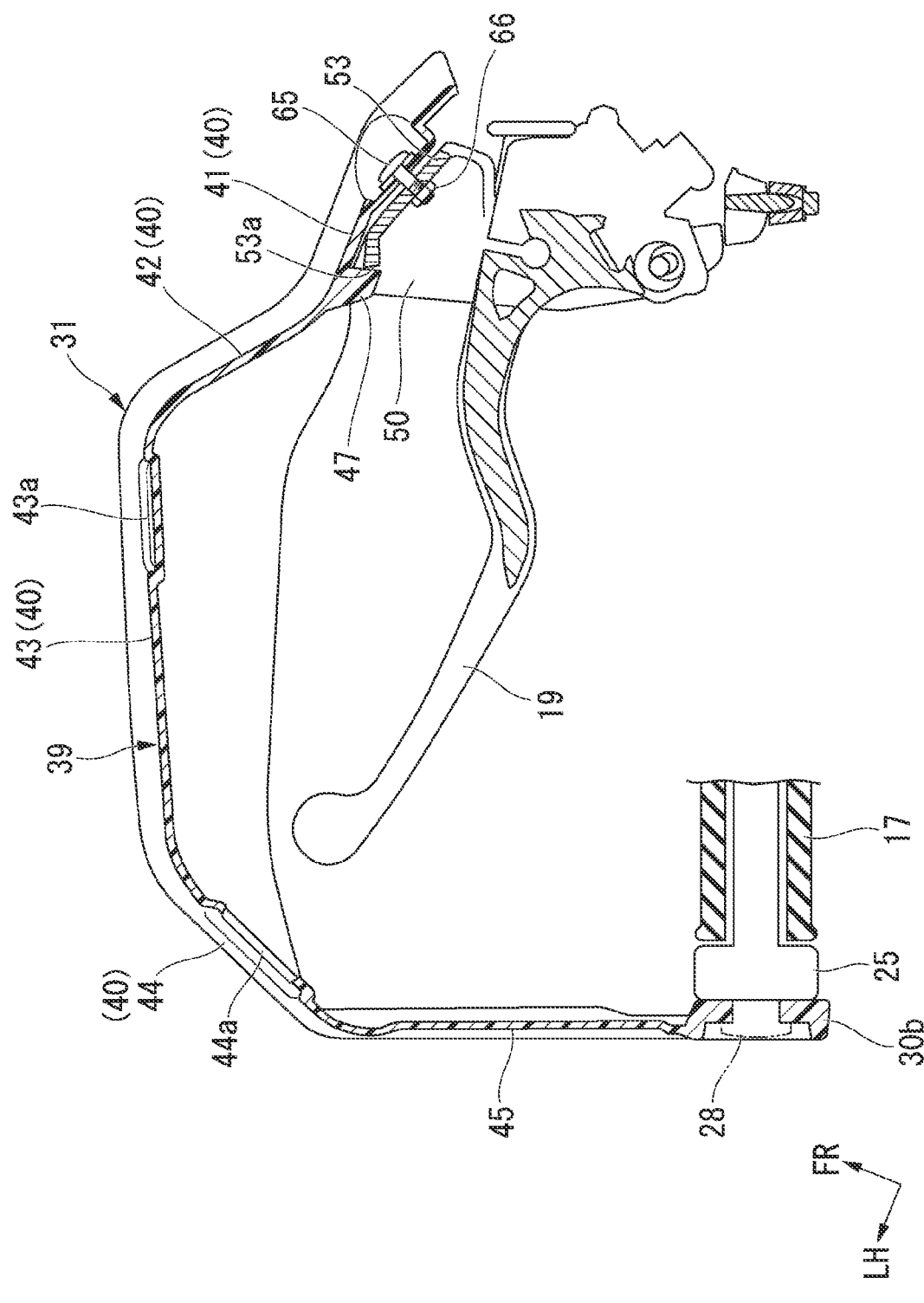
FIG. 9 is a view including a line IX-IX cross section of FIG. 1.

The knuckle guard 30 extends outward in the vehicle width direction in a state in which the inward end portion 30a thereof is fixed to the lever holder 20 and covers the grip 17 in the vehicle width direction. Reference sign 25 in the drawing indicates a weight protruding outward from the grip 17 in the vehicle width direction. The weight 25 has a function of suppressing the vibration of the handlebar 15. In FIG. 9, reference sign 28 indicates a bolt for fixing an outward end portion 30b of the knuckle guard 30.

Figure 7:
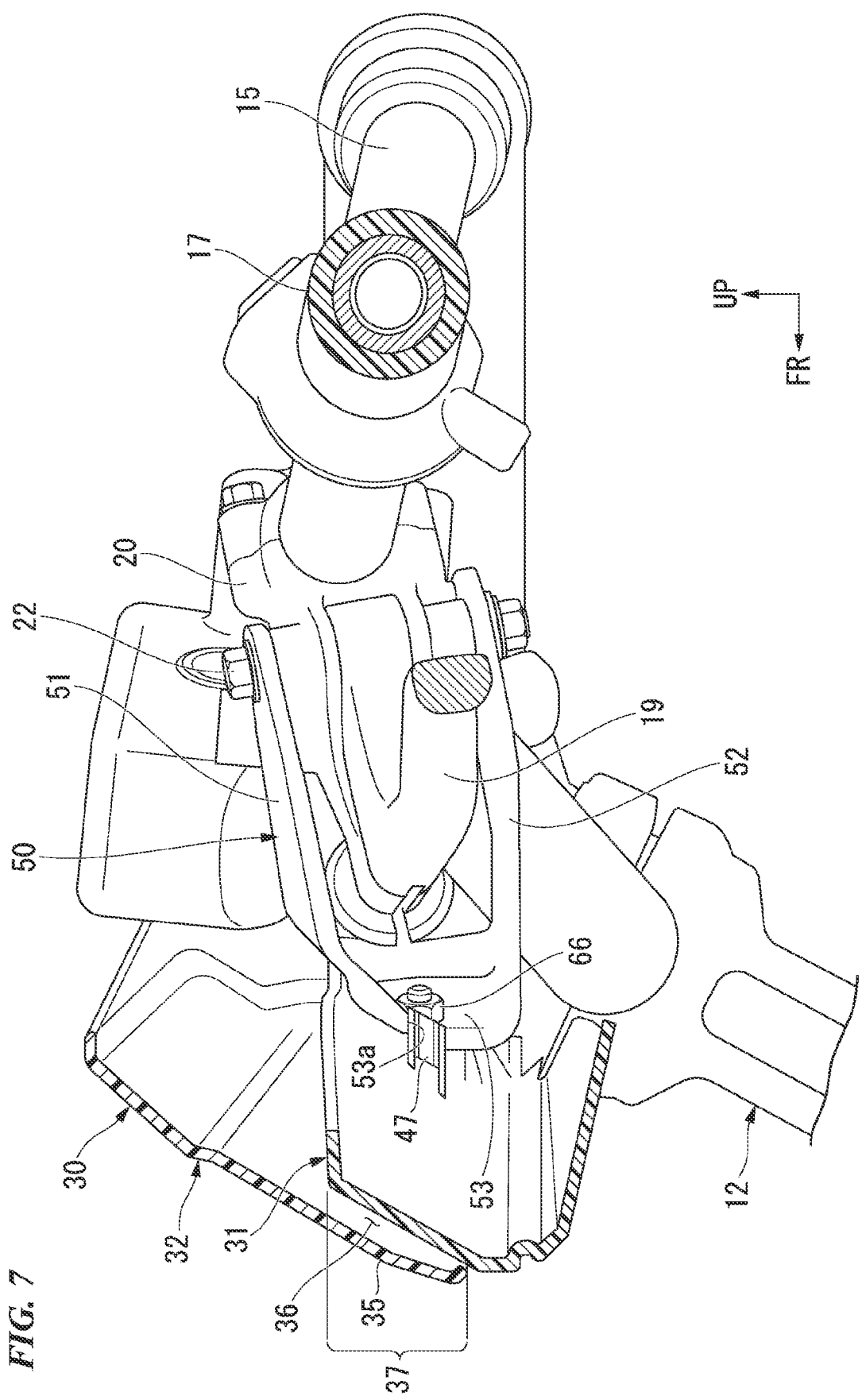
FIG. 7 is a view including a line VII-VII cross section of FIG. 5.

As shown in FIG. 7, the knuckle guard 30 includes a wind guide portion 35 disposed in front of the grip 17. The wind guide portion 35 has a communication hole 36 that opens in a vertical direction. The wind guide portion 35 covers the communication hole 36 such that the communication hole 36 cannot be seen in a front view.

The knuckle guard 30 has a divided structure. The knuckle guard 30 includes a first protective member 31 disposed in front of the grip 17 and a second protective member 32 disposed in front of the first protective member 31.

<First Protective Member 31>

Figure 4:
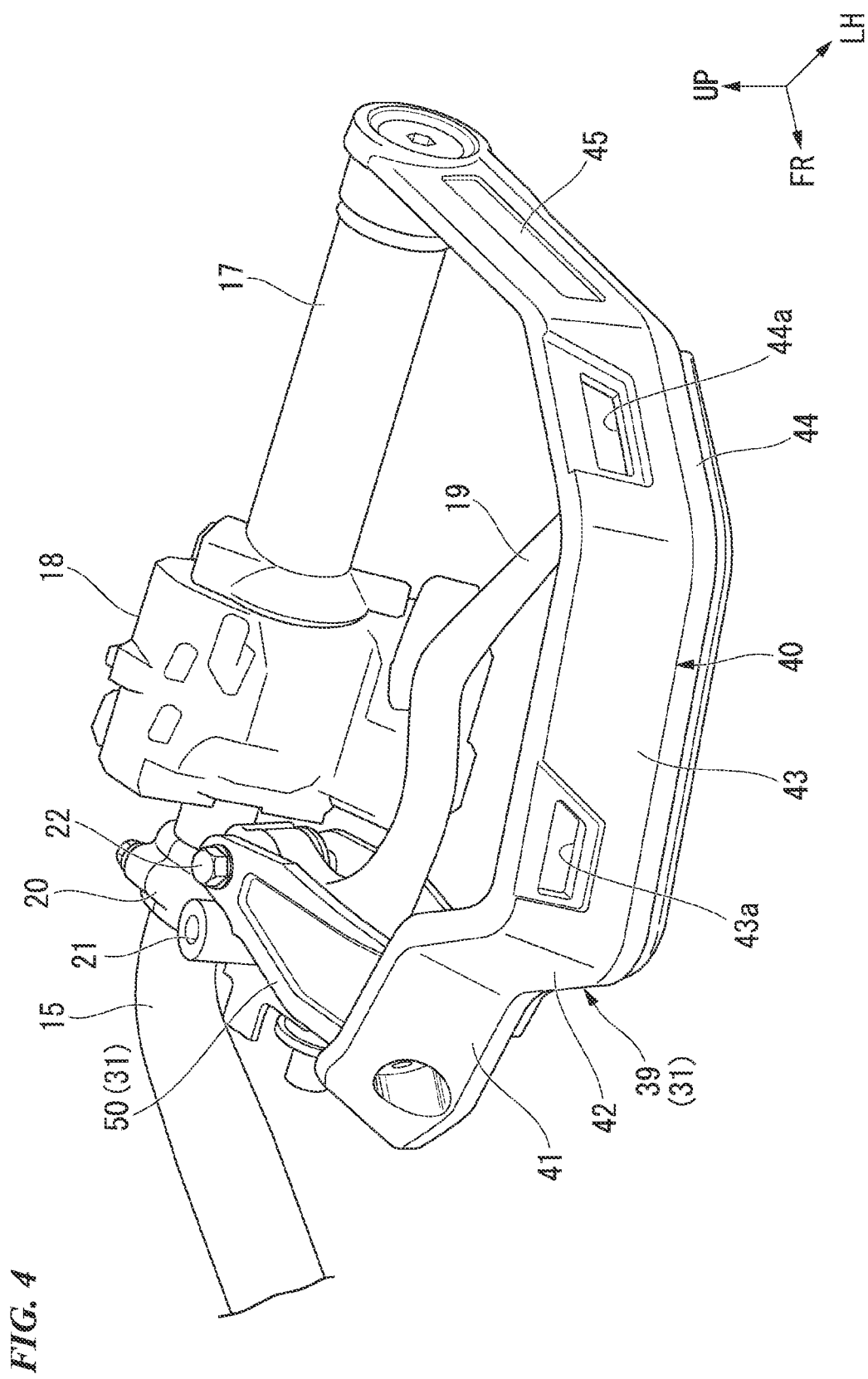
FIG. 4 is a perspective view of a first protective member according to the first embodiment from the front upper side.

In a top view, the first protective member 31 has a U-shape that opens rearward (see FIG. 9). As shown in FIG. 4, the first protective member 31 includes a guard member 39 disposed in front of the grip 17 and a connecting member 50 for connecting the guard member 39 and the lever holder 20 to each other.

The guard member 39 has an L shape in the top view to protect the front surface and the side surface of the knuckle portion of a rider (see FIG. 9). The guard member 39 includes a front protective portion 40 located in front of the grip 17 and a lateral protective portion 45 located on a lateral side of the grip 17. The front protective portion 40 and the lateral protective portion 45 are integrally formed of the same member.

Figure 6:
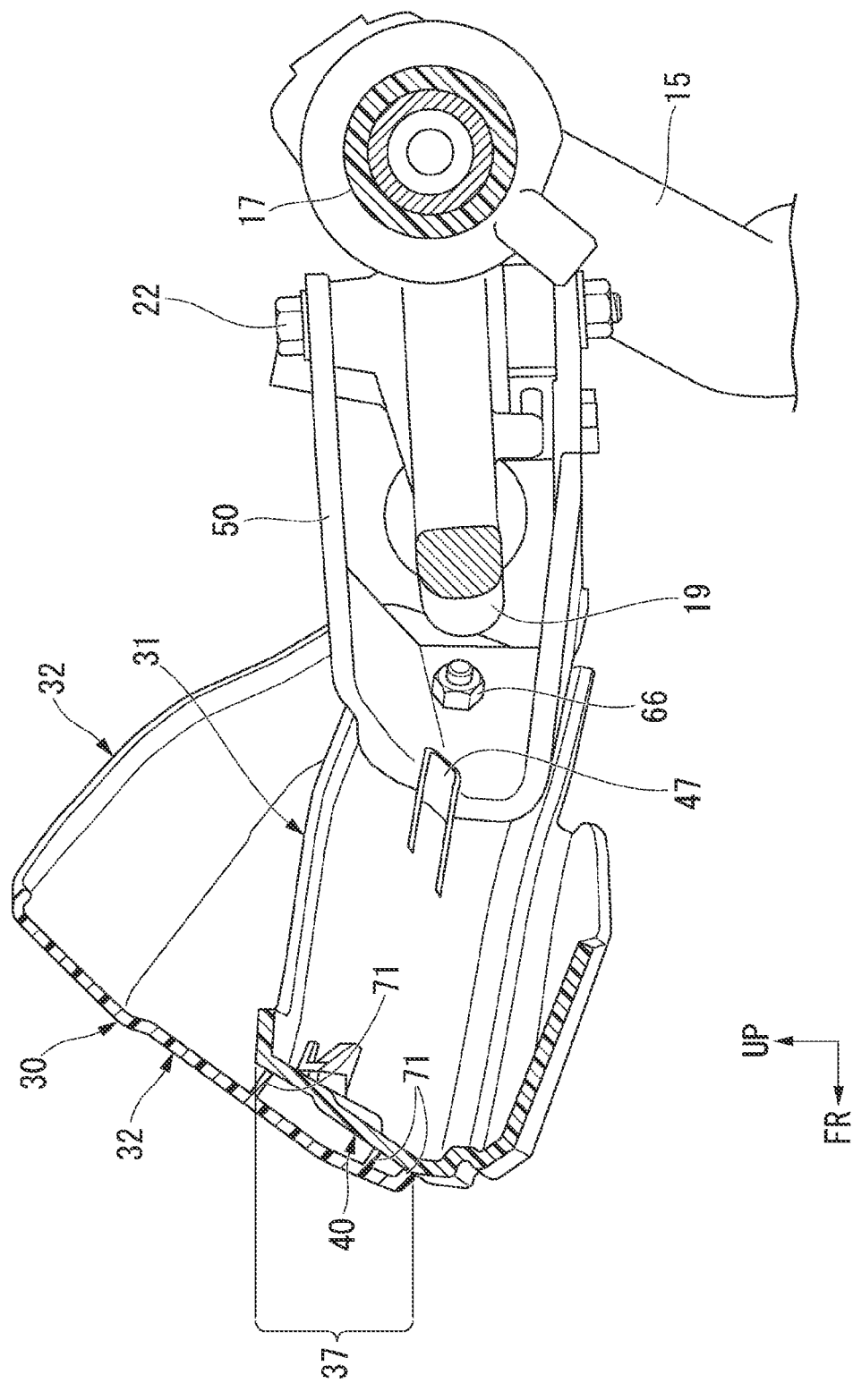
FIG. 6 is a view including a line VI-VI cross section of FIG. 5.

In a cross-sectional view, the front protective portion 40 has a U-shape that opens rearward (see FIG. 6). As shown in FIG. 9, the front protective portion 40 includes a first extending portion 41, a second extending portion 42, a third extending portion 43, and a fourth extending portion 44.

In the top view, the first extending portion 41 is inclined such that an inward end of the first extending portion 41 in the vehicle width direction is located at the rear and an outward end of the first extending portion 41 in the vehicle width direction is located at the front. The first extending portion 41 is fixed to the connecting member 50. Reference signs 65 and 66 in the drawing indicate a bolt and a nut for fixing the first extending portion 41 to the connecting member 50, respectively.

An engaging convex portion 47 that can engage with a concave portion 53a of a front wall portion 53 of the connecting member 50 is provided in an outward portion of the first extending portion 41 in the vehicle width direction (a portion adjacent to the second extending portion 42) (see FIG. 9). The engaging convex portion 47 protrudes rearward from a rear surface of the outward portion of the first extending portion 41 in the vehicle width direction (see FIG. 7).

In the top view, the second extending portion 42 extends diagonally forward and outward from the outward end of the first extending portion 41 in the vehicle width direction. The second extending portion 42 connects the first extending portion 41 and the third extending portion 43 to each other.

In the top view, the third extending portion 43 extends outward in the vehicle width direction from a front end of the second extending portion 42. The third extending portion 43 has an insertion hole 43a into which an engaging claw 74 (see FIG. 16) of the second protective member 32 is inserted. The insertion hole 43a has a rectangular shape having a length in the vehicle width direction (specifically, an extending direction of the third extending portion 43) (see FIG. 4). The insertion hole 43a is disposed in an upper part of an inward portion of the third extending portion 43 in the vehicle width direction (see FIG. 4).

In the top view, the fourth extending portion 44 extends diagonally rearward and outward from an outward end of the third extending portion 43 in the vehicle width direction. The fourth extending portion 44 has an attachment hole 44a for attaching the second protective member 32 (see FIG. 16). The attachment hole 44a has a rectangular shape having a length in the vehicle width direction (specifically, an extending direction of the fourth extending portion 44) (see FIG. 4). The attachment hole 44a is disposed in an upper part of the fourth extending portion 44 (see FIG. 4).

In the top view, the lateral protective portion 45 extends rearward from an outward end of the fourth extending portion 44 in the vehicle width direction. The rear end portion of the lateral protective portion 45 is fixed to an outward end portion of the handlebar 15 in the vehicle width direction.

Figure 11:
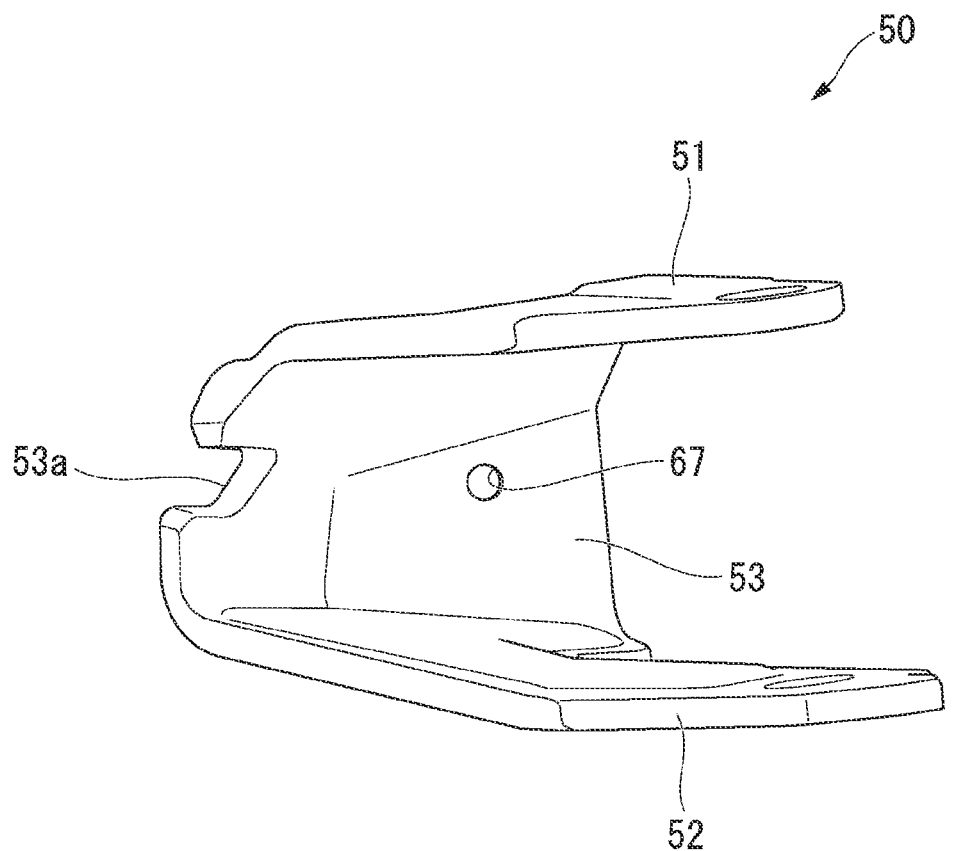
FIG. 11 is a rear view of a connecting member according to the first embodiment.

In the top view, a contour of the connecting member 50 has a U-shape that is convex rearward (see FIG. 5). In the cross-sectional view, the connecting member 50 has a U-shape that opens rearward (see FIG. 8). As shown in FIG. 11, the connecting member 50 has an upper wall portion 51, a lower wall portion 52, and a front wall portion 53. The upper wall portion 51, the lower wall portion 52, and the front wall portion 53 are integrally formed of the same member.

Figure 8:
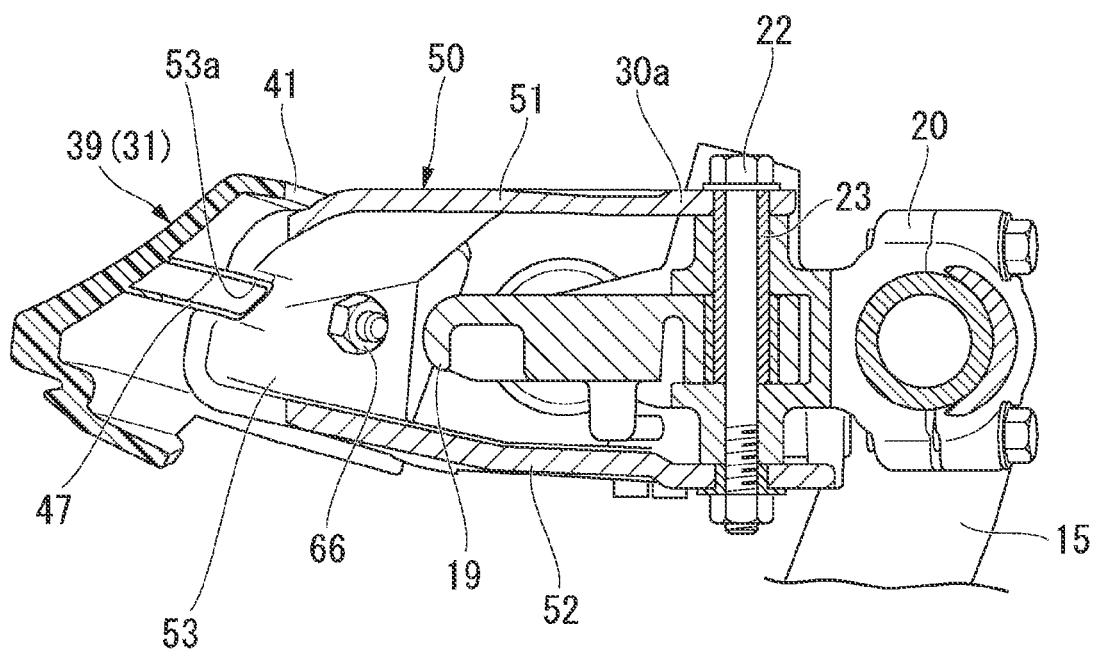
FIG. 8 is a view including a line VIII-VIII cross section of FIG. 5.

As shown in FIG. 8, the upper wall portion 51 is disposed above the clutch lever 19. The upper wall portion 51 has a plate shape extending in a front-rear direction.

The lower wall portion 52 is disposed below the clutch lever 19. The lower wall portion 52 has a plate shape extending in the front-rear direction.

The front wall portion 53 is disposed in front of the clutch lever 19. The front wall portion 53 connects a front end of the upper wall portion 51 and a front end of the lower wall portion 52 to each other. In the top view, the front wall portion 53 is inclined along the first extending portion 41 of the front protective portion 40 such that an inward end of the front wall portion 53 in the vehicle width direction is located at the rear and an outward end of the front wall portion 53 in the vehicle width direction is located at the front (see FIG. 9). The front wall portion 53 is provided with a recess 53a that opens outward in the vehicle width direction.

Figure 10:
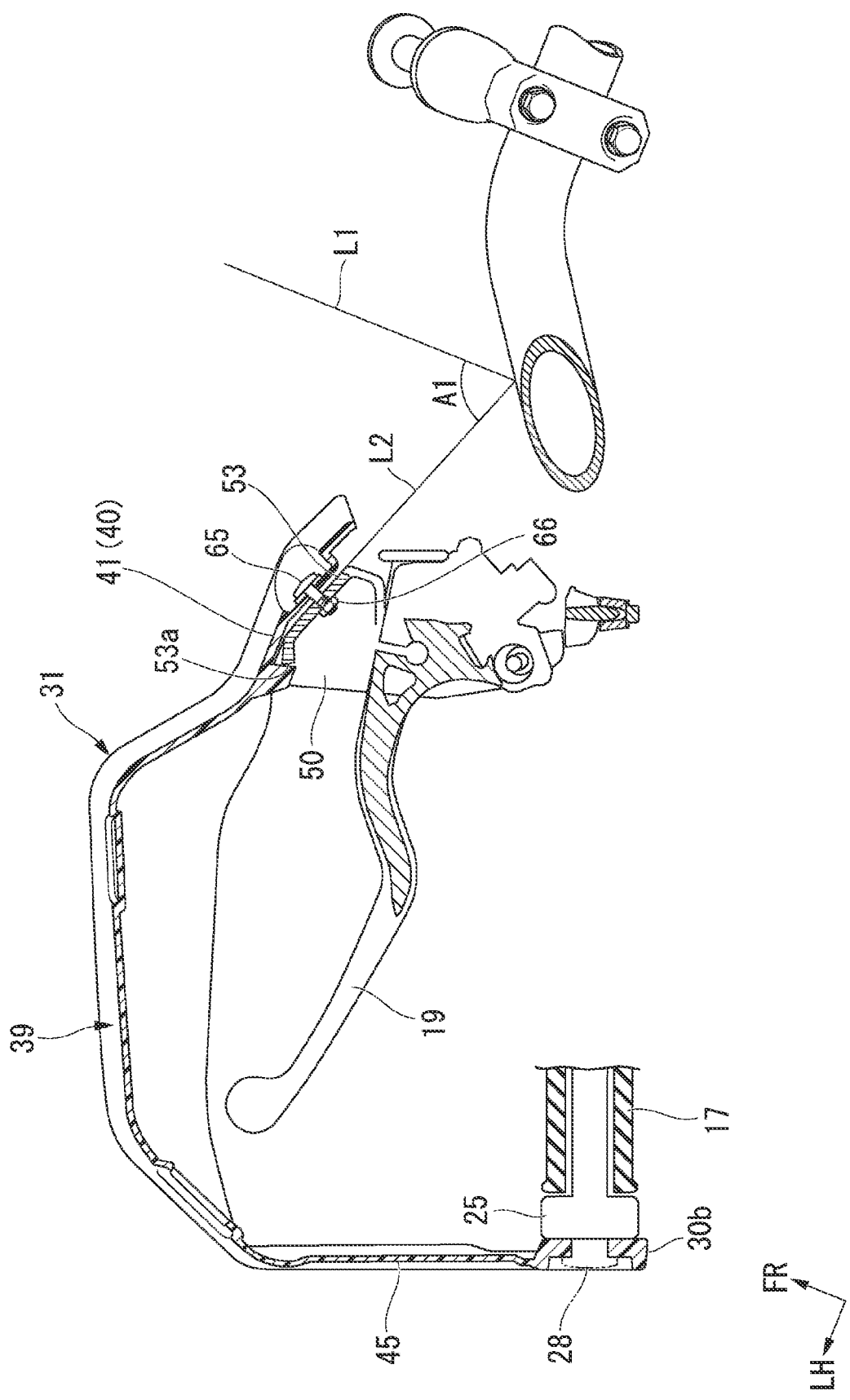
FIG. 10 is a view showing a disposition of the knuckle guard according to the first embodiment.

As shown in FIG. 11, the front wall portion 53 of the connecting member 50 is provided with a circular through hole 67 through which a shaft portion of the bolt 65 (see FIG. 9) can be inserted. In FIG. 10, reference sign L1 indicates a virtual straight line extending in the front-rear direction, and reference sign L2 indicates a virtual extension line along a front surface of the front wall portion 53. For example, an angle A1 formed by the virtual straight line L1 and the virtual extension line L2 (the front surface of the front wall portion 53) is 90 degrees or less (an acute angle).

<Second Protective Member 32>

As shown in FIG. 2, the second protective member 32 has a contour larger than that of the front protective portion 40 of the first protective member 31. The second protective member 32 extends in the vehicle width direction along the front protective portion 40. An upper end of the second protective member 32 is located above an upper end of the first protective member 31. An upper edge of the second protective member 32 has a curved shape that projects upward. A lower end of the second protective member 32 is located above a lower end of the front protective portion 40. The lower end of the second protective member 32 has a contour along a front edge of the front protective portion 40. In the cross-sectional view, a front surface of the second protective member 32 is inclined such that the upper end of the second protective member 32 is located at the rear and the lower end of the second protective member 32 is located at the front (see FIG. 6)).

A plurality of (for example, three in the embodiment) ribs 70 are provided on the front surface of the second protective member 32. The rib 70 extends along an inclination direction of the front surface of the second protective member 32. The three ribs 70 are disposed at intervals in the vehicle width direction (specifically, the extending direction of the second protective member 32).

The second protective member 32 is attachable to and detachable from the first protective member 31.

An inward portion of the second protective member 32 in the vehicle width direction is attached to the first extending portion 41 of the first protective member 31 with a fastening member 29 such as a bolt. The second protective member 32 together with the first protective member 31 is attached to the connecting member 50 to be detachable from the connecting member 50.

Figure 12:
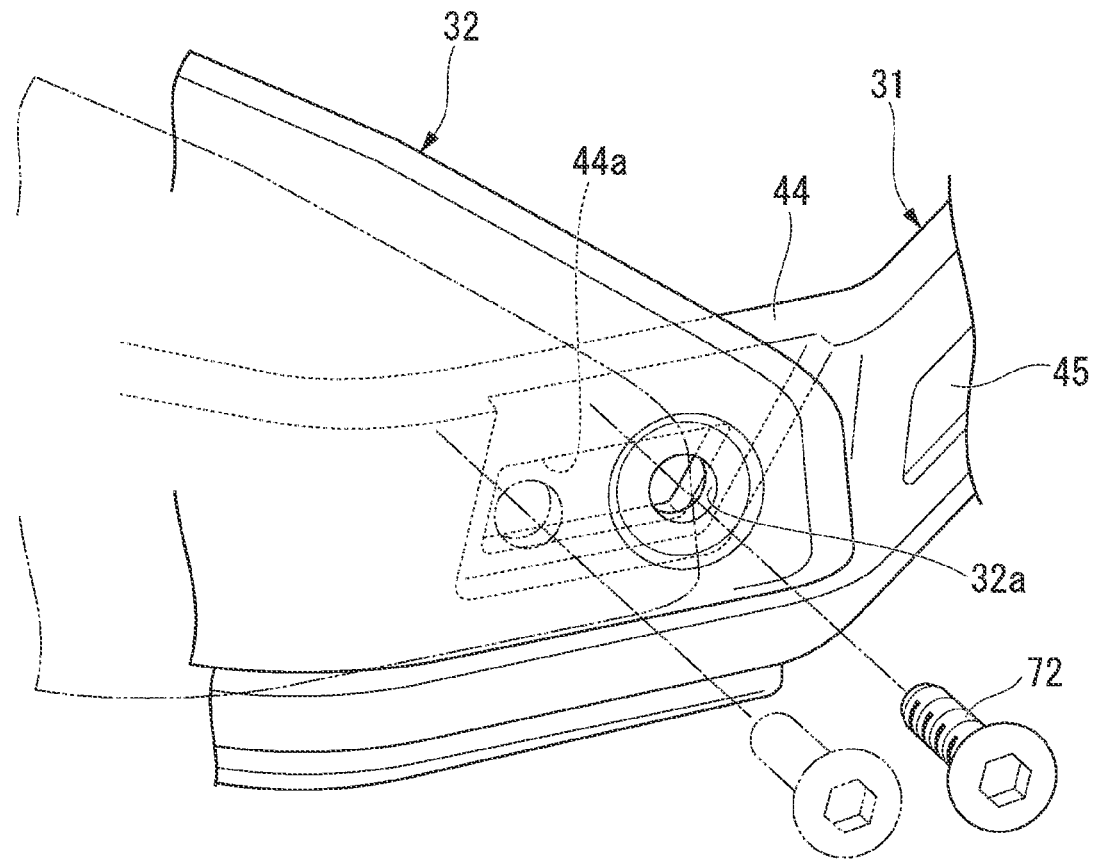
FIG. 12 is a view showing an attachment structure between the first protective member and a second protective member according to the first embodiment.

An outward end portion of the second protective member 32 in the vehicle width direction is attached to the fourth extending portion 44 of the first protective member 31 with a fastening member 72 such as a bolt. A solid line in FIG. 12 shows an initial state before the second protective member 32 is bent. As shown in FIG. 12, a circular through hole 32a through which a shaft portion of the bolt 72 can be inserted is provided in an outward portion of the second protective member 32 in the vehicle width direction. For example, the bolt 72 is inserted into an attachment hole 44a of the fourth extending portion 44 through the through hole 32a of the second protective member 32, and the bolt 72 protrudes from a rear surface of the fourth extending portion 44 (see FIG. 16). Then, the second protective member 32 can be fixed to the first protective member 31 by the nut 73 being screwed onto the protruding portion (a male screw portion) of the bolt 72 (see FIG. 16).

Figure 16:
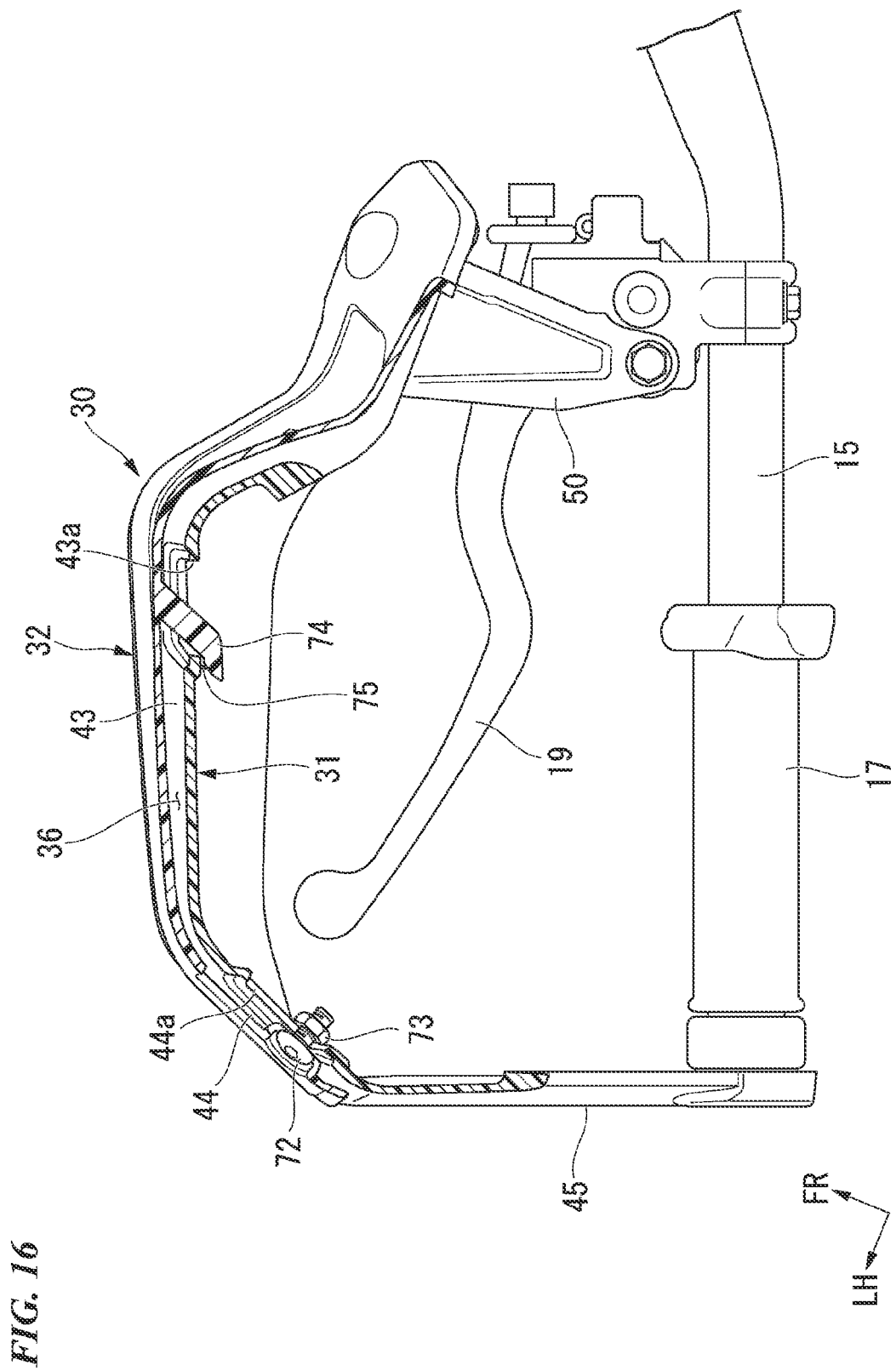
FIG. 16 is a view showing an operation of the second protective member according to the first embodiment.

As shown in FIG. 16, the engaging claw 74 inserted into the insertion hole 43a of the third extending portion 43 of the first protective member 31 is provided at the central portion of the second protective member 32 in the vehicle width direction. The engaging claw 74 functions as a positioning portion that defines a relative position between the first protective member 31 and the second protective member 32 in the insertion hole 43a. The engaging claw 74 protrudes rearward from a rear surface of the central portion of the second protective member 32 in the vehicle width direction. The engaging claw 74 has an L shape that extends diagonally leftward and rearward.

<Communication Hole 36>

As shown in FIG. 7, the first protective member 31 and the second protective member 32 form a stacked portion 37 in which the protective members overlap each other. The communication hole 36 opens the stacked portion 37 in the vertical direction. The stacked portion 37 is a portion at which the front protective portion 40 of the first protective member 31 and a lower part of the second protective member 32 overlap each other in the front view (see FIG. 2). The communication hole 36 is a gap between a front surface of the front protective portion 40 and a lower rear surface of the second protective member 32. In the cross-sectional view, the communication hole 36 is inclined such that an opening upper end thereof is located at the rear and an opening lower end thereof is located at the front.

<Operation of Knuckle Guard 30>

Figure 15:
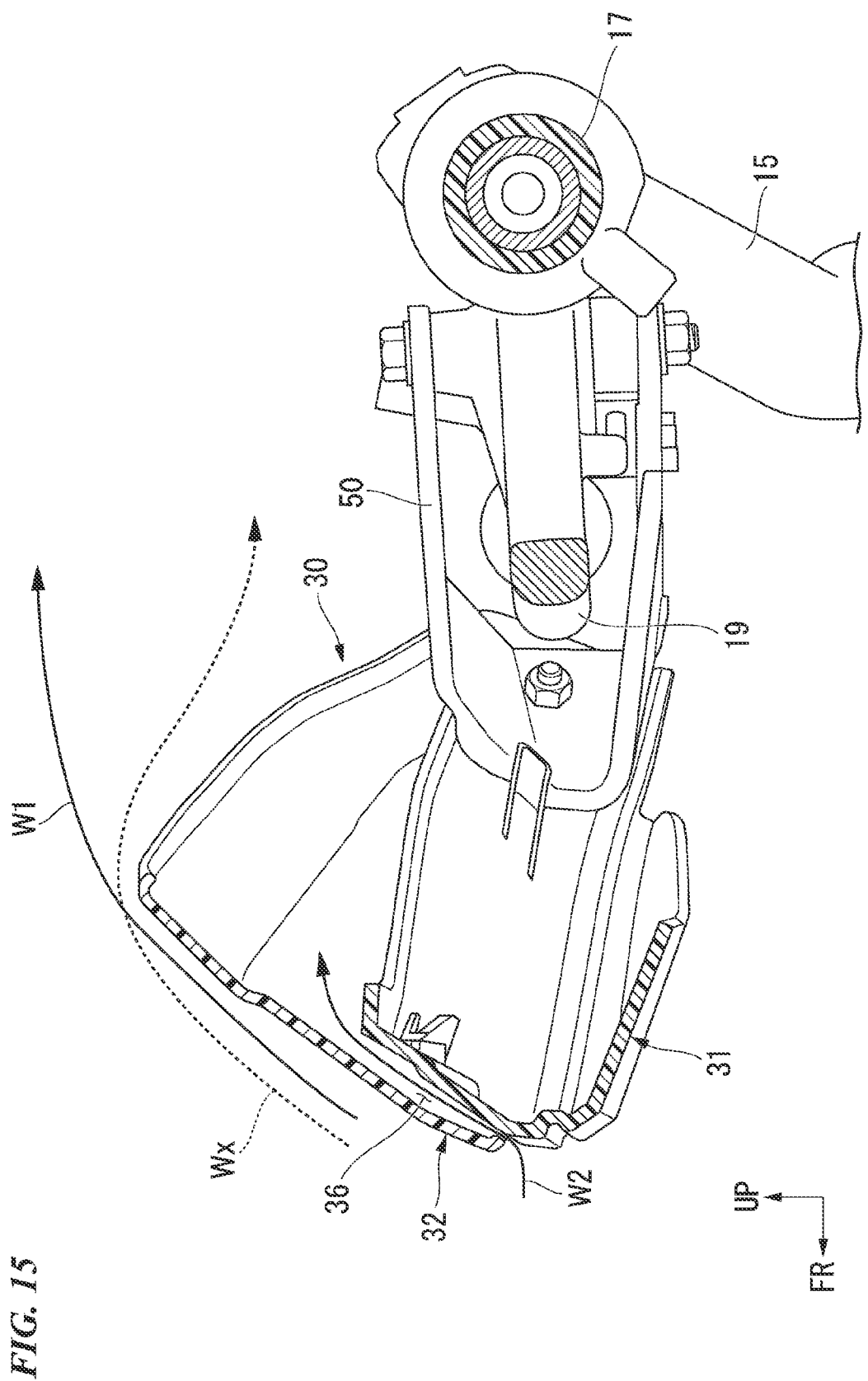
FIG. 15 is a view showing an operation of the knuckle guard according to the first embodiment.

An operation of the knuckle guard 30 according to the embodiment will be described with reference to FIG. 15 together with a comparative example.

The comparative example does not have the communication hole 36 according to the embodiment. Alternatively, in the comparative example, the opening lower end of the communication hole 36 is closed. In the drawing, an arrow Wx indicates the flow of the traveling wind of the comparative example, and arrows W1 and W2 indicate the flow of the traveling wind of the embodiment.

In the comparative example, the traveling wind flows rearward and upward along the front surface of the second protective member 32 and then enters the rear of the second protective member 32 (see the arrow Wx). In the comparative example, the pressure difference between the front and the rear of the knuckle guard 30 becomes large, and thus the traveling wind is trapped in an upper part of the second protective member 32.

In the embodiment, the traveling wind flows rearward and upward along the front surface of the second protective member 32 (see the arrow W1) and at the same time enters the communication hole 36 from the opening lower end of the communication hole 36 (see the arrow W2). The wind that has flowed along the front surface of the second protective member 32 flows rearward and upward from an upper edge of the second protective member 32. The wind that has entered the communication hole 36 enters the rear of the second protective member 32. In the embodiment, by allowing some of the traveling wind to flow to the rear of the second protective member 32, it is possible to reduce the pressure difference between the front and the rear of the knuckle guard 30, and it is possible to suppress the trapping of the traveling wind.

<Operation of Second Protective Member 32 According to the Embodiment>

An operation of the second protective member 32 according to the embodiment will be described with reference to FIGS. 16 and 17.

The second protective member 32 can enlarge the communication hole 36 by being bent inward in the vehicle width direction along the attachment hole 44a in the first protective member 31.

FIG. 16 shows the initial state before the second protective member 32 is bent. In FIG. 16, the bolt 72 inserted into the through hole 32a (see FIG. 12) in the outward portion of the second protective member 32 in the vehicle width direction is fixed to an outward side of the attachment hole 44a of the fourth extending portion 44 in the vehicle width direction. In FIG. 16, the engaging claw 74 engages with an opening edge portion (hereinafter referred to as an "insertion hole forming portion") of the insertion hole 43a of the third extending portion 43.

Figure 13:
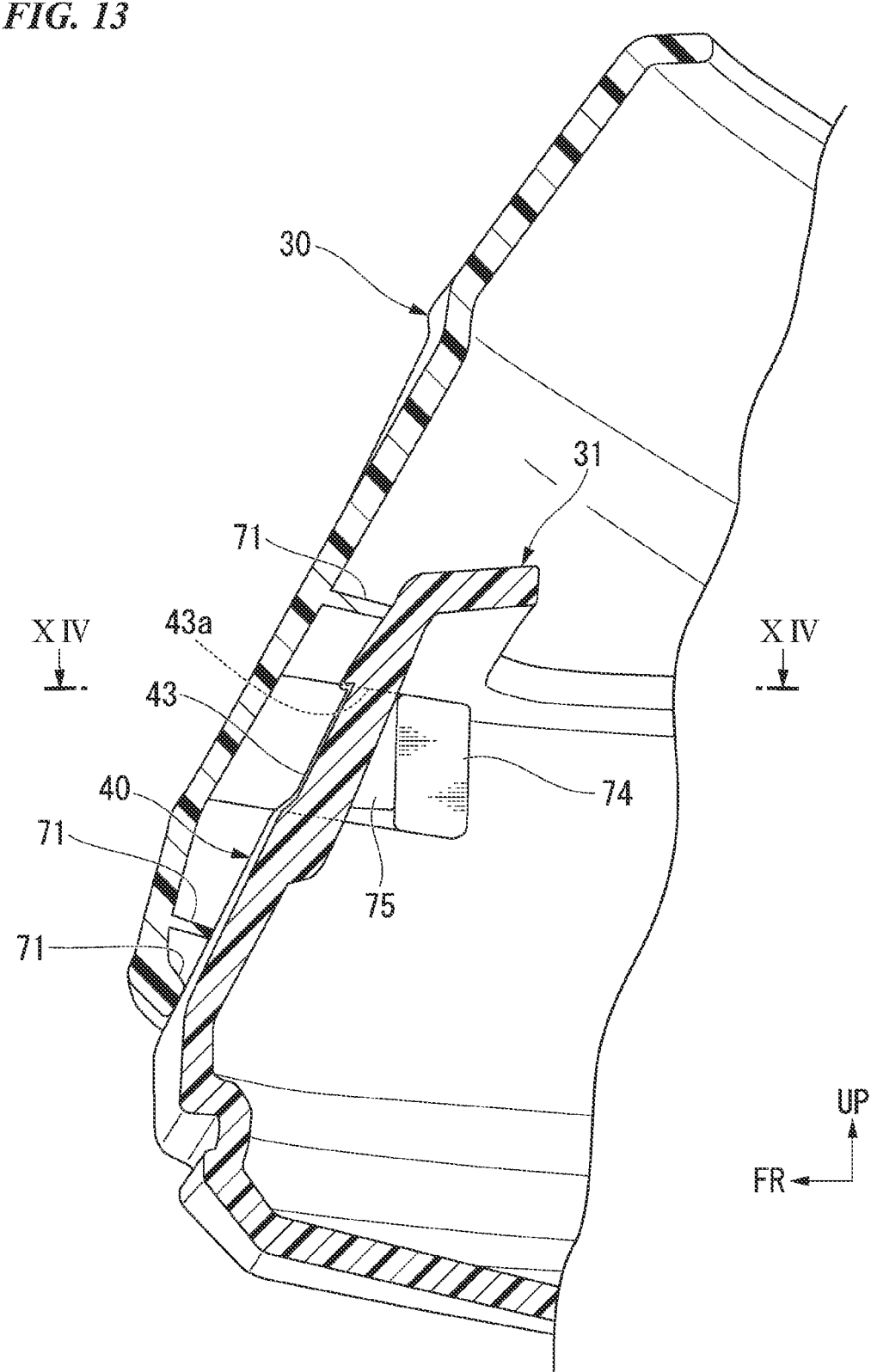
FIG. 13 is a view including a line XIII-XIII cross section of FIG. 5.
Figure 14:
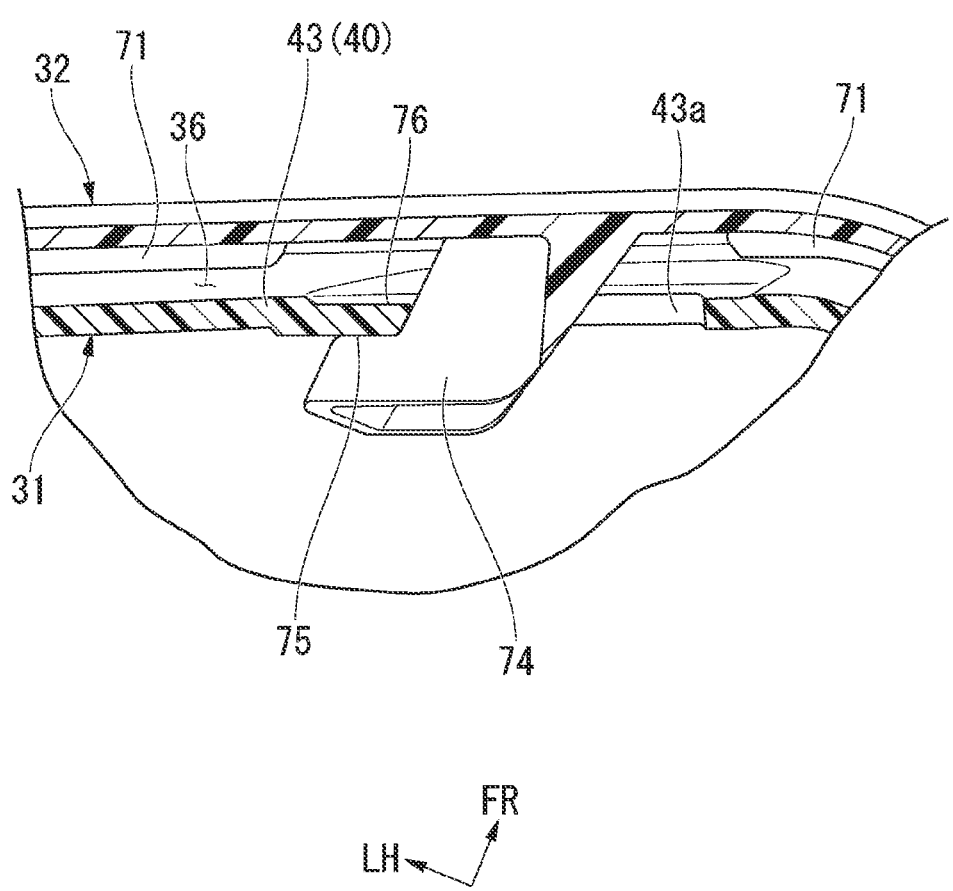
FIG. 14 is a view including a line XIV-XIV cross section of FIG. 13.

As shown in FIG. 13, the insertion hole forming portion is provided with an engaging protrusion 75 that functions as a positioning portion together with the engaging claw 74. In a side view, the engaging protrusion 75 has a triangular shape that protrudes downward from a rear surface (an inclined surface) of the first protective member 31. In the initial state, the engaging claw 74 comes into contact with a rear surface of the engaging protrusion 75. In the initial state, when the engaging claw 74 engages with the insertion hole forming portion (the engaging protrusion 75), the movement of the second protective member 32 forward and outward in the vehicle width direction with respect to the first protective member 31 is restricted (see FIG. 14).

In FIG. 13, reference sign 71 indicates a positioning convex portion that defines a front-rear distance between the first protective member 31 and the second protective member 32 in the initial state. A plurality of positioning convex portions 71 (three in the drawing) are provided at intervals in the vertical direction. The positioning convex portions 71 are provided at intervals in the vehicle width direction. A gap between the two positioning convex portions 71 adjacent to each other in the vehicle width direction forms the communication hole 36 (see FIG. 7).

Figure 17:
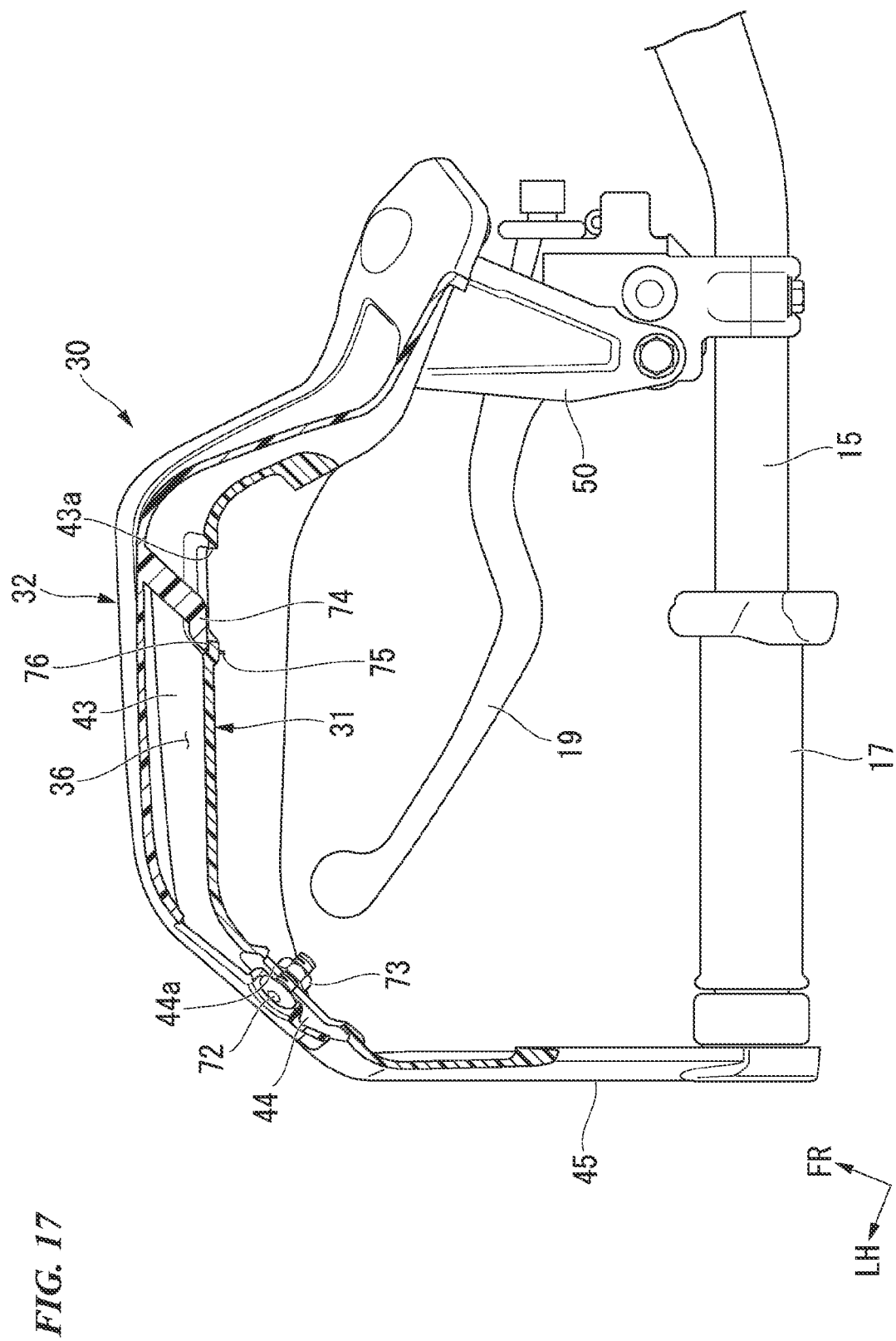
FIG. 17 is a view showing an operation of the second protective member following FIG. 16.

FIG. 17 shows a state in which the second protective member 32 is bent. In FIG. 17, the bolt 72 inserted into the through hole 32a (see FIG. 12) in the outward portion of the second protective member 32 in the vehicle width direction is fixed to an inward side of the attachment hole 44a of the fourth extending portion 44 in the vehicle width direction. A two-dot chain line in FIG. 12 shows a state in which the second protective member 32 is bent to form a curved shape that projects forward.

For example, in a state in which the inward portion of the second protective member 32 in the vehicle width direction is fastened, when the outward portion of the second protective member 32 in the vehicle width direction is shifted inward in the vehicle width direction, the second protective member 32 is bent to have a curved shape that projects forward. The engaging claw 74 comes into contact with a stepped portion 76 on a front surface of the third extending portion 43 without engaging with the insertion hole forming portion. Then, in a state in which the second protective member 32 is bent, the outward portion of the second protective member 32 in the vehicle width direction is fastened. As a result, the communication hole 36 can be enlarged from the initial state shown in FIG. 16.

As described above, the knuckle guard 30 according to the embodiment includes the wind guide portion 35 that is disposed in front of the grip 17 of the handlebar 15 of the vehicle and has the communication hole 36 which opens in the vertical direction, and the wind guide portion 35 covers the communication hole 36 in the front view.

According to the present embodiment, the wind guide portion 35 covers the communication hole 36 in the front view, and thus the present embodiment does not have an opening in a forward direction of the vehicle. Therefore, it is possible to protect the knuckle portion and the arm portion of the rider from wind, water, mud, gravel, branches, and the like during travel with the wind guide portion 35. Therefore, it is possible to suppress impairment of windproof, mudproof, gravel-proof, and branch-proof effects during travel. In addition, by providing the wind guide portion 35 that is disposed in front of the grip 17 of the handlebar 15 of the vehicle and has the communication hole 36 which opens in the vertical direction, it is possible to correct a negative pressure behind the knuckle guard 30 with the communication hole 36. Therefore, it is possible to obtain a larger windproof effect with a smaller front projection area. In addition, since the communication hole 36 cannot be seen from the front, it creates a sense of unity with the knuckle guard 30 and is excellent in design.

The knuckle guard 30 includes the first protective member 31 disposed in front of the grip 17 and the second protective member 32 disposed in front of the first protective member 31, the first protective member 31 and the second protective member 32 form the stacked portion 37 in which the protective members overlap each other, and the communication hole 36 opens the stacked portion 37 in the vertical direction, and thus the following effects are exhibited.

According to this configuration, since the knuckle guard 30 has a divided structure and the communication hole 36 is formed by the stacked portion 37 of the divided components (the first protective member 31 and the second protective member 32), the knuckle guard 30 is suppressed to have a complicated structure and the knuckle guard 30 is easily formed.

The first protective member 31 has the attachment hole 44a for attaching the second protective member 32, the attachment hole 44a is an elongate hole having a length in the vehicle width direction, and the second protective member 32 can expand the communication hole 36 by being bent inward in the vehicle width direction along the attachment hole 44a, and thus the following effects are exhibited.

According to this configuration, when the second protective member 32 is bent inward in the vehicle width direction and is fixed to the inward side of the attachment hole 44a of the first protective member 31 in the vehicle width direction, the communication hole 36 (the gap) of the stacked portion 37 is enlarged, and thus it is possible to adjust the wind amount flowing rearward from the knuckle guard 30 (the wind amount for correcting the negative pressure behind the knuckle guard 30). Therefore, it is easy to adjust the windproof range and the wind amount behind the knuckle guard 30 according to the rider's preference, in consideration of the traveling conditions such as the traveling speed and the air temperature (including the ambient temperature of the hands).

The first protective member 31 has the insertion hole 43a that is an elongate hole having a length in the vehicle width direction, and the positioning portion 74 that defines a position in the insertion hole 43a is provided between the first protective member 31 and the second protective member 32, and thus the following effects are exhibited.

According to this configuration, it is possible to define a relative position between the first protective member 31 and the second protective member 32.

The second protective member 32 is provided with the engaging claw 74 as the positioning portion 74 which can be inserted into the insertion hole 43a of the first protective member 31, the engaging claw 74 has an L shape that extends diagonally rearward and outward from the rear surface of the second protective member 32, in the initial state before the second protective member 32 is bent, the engaging claw 74 engages with the opening edge portion of the insertion hole 43a of the first protective member 31, and in the state in which the second protective member 32 is bent to form a curved shape that projects forward, the engaging claw 74 comes into contact with the stepped portion 76 on the front surface of the first protective member 31, and thus the following effects are exhibited.

According to this configuration, it is possible to define a relative position between the first protective member 31 and the second protective member 32 in each of the initial state and the curved state of the second protective member 32.

The second protective member 32 is attachable to and detachable from the first protective member 31, and thus the following effects are exhibited.

According to this configuration, by removing the second protective member 32 from the first protective member 31, it is possible to use the knuckle guard with only the first protective member 31. For example, during long-distance travel or off-road travel, the second protective member 32 is attached to the first protective member 31 for travel. For example, during low-speed travel or on-road travel in an urban area, the vehicle travels with only the first protective member 31. For example, when the temperature is low, the second protective member 32 is attached to the first protective member 31 for travel. For example, when the temperature is high, the vehicle travels with only the first protective member 31. In this way, the specifications of the knuckle guard 30 can be changed according to the conditions, and thus the degree of freedom in changing the specifications is improved. In addition, the specifications can be changed by adding only a part of the component without replacing the whole knuckle guard 30 with another component, and thus the cost of the component is reduced. In addition, in a case in which the first protective member 31 has the attachment hole 44a for attaching the second protective member 32, the attachment hole 44a can function as a wind guide hole.

Second Embodiment

Next, a second embodiment will be described. In the second embodiment, the same configuration elements as those in the first embodiment are designated by the same reference signs, and detailed description thereof will be omitted.

In the above-described embodiment, an example including a bolt 72 and a nut 73 for fastening the first protective member 31 and the second protective member 32 has been described, but the present invention is not limited to this. The second embodiment is different from the first embodiment in that it includes an opening adjusting structure for adjusting an opening area of the communication hole such that the communication hole can be closed.

Figure 18:
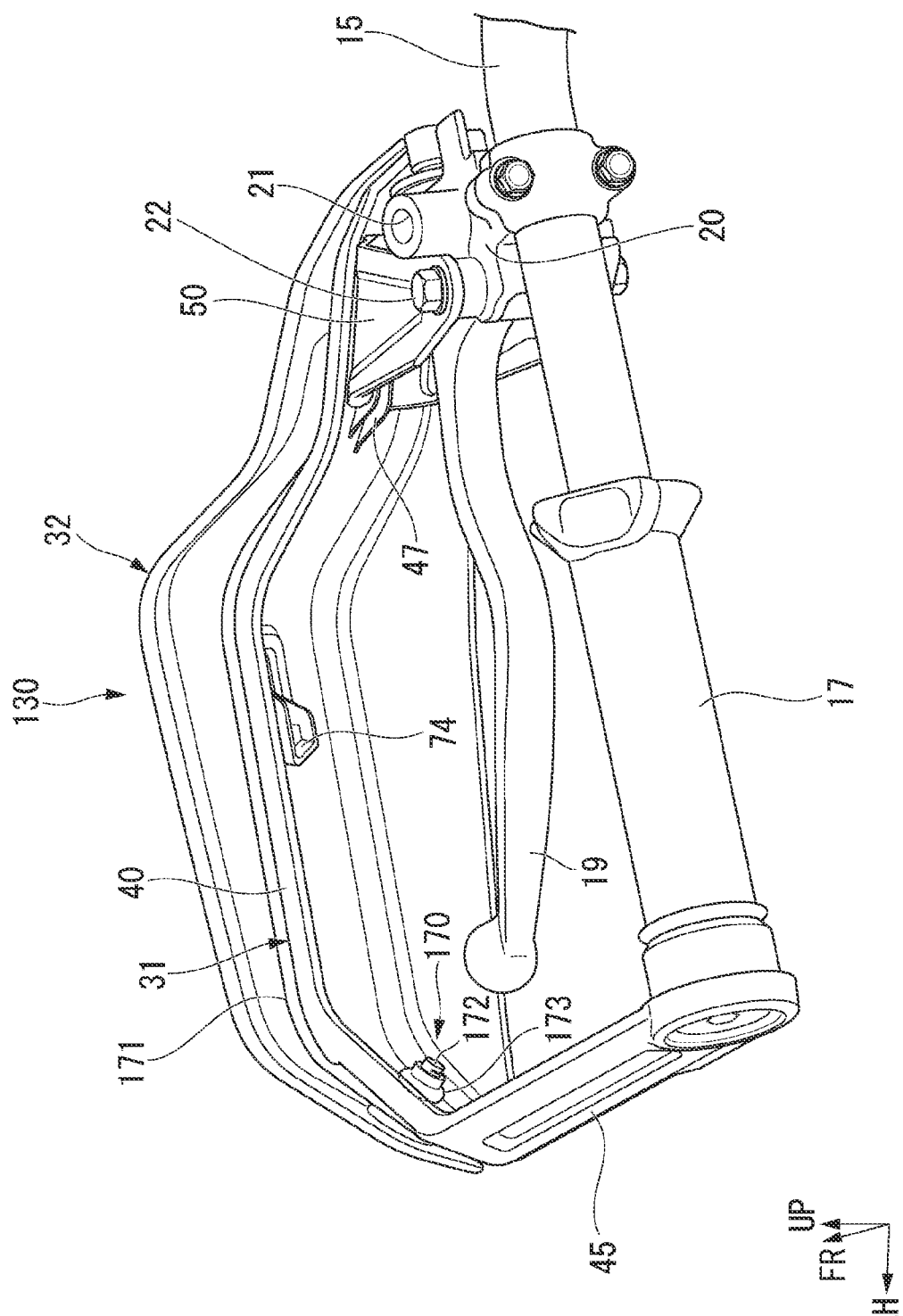
FIG. 18 is a perspective view of a knuckle guard according to a second embodiment from the rear upper side.
Figure 21:
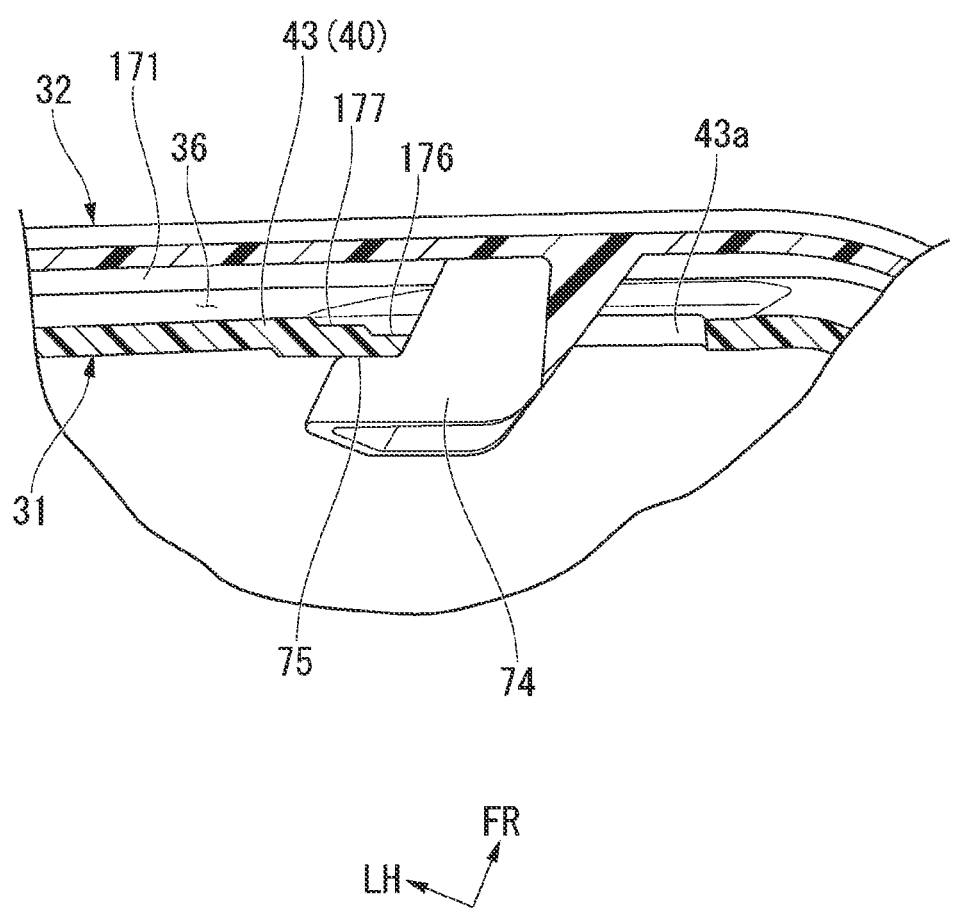
FIG. 21 is a view including a line XXI-XXI cross section of FIG. 20.

As shown in FIG. 18, the opening adjusting structure 170 includes an elastic convex portion 173 that protrudes rearward from the second protective member 32 and is elastically deformable, an attachment hole 44a (see FIG. 19) that is an elongate hole provided on the first protective member 31 and having a length in the vehicle width direction and is for attaching the elastic convex portion 173, a fastening member 172 that fastens the first protective member 31 and the second protective member 32 to each other by elastically deforming the elastic convex portion 173, a windproof convex portion 171 that is provided between the first protective member 31 and the second protective member 32 and blocks at least some of the wind that has entered the communication hole 36, an engaging claw 74, an insertion hole 43a, an engaging protrusion 75, and a plurality of (for example, two in this embodiment) stepped portions 176 and 177 (a first stepped portion 176 and a second stepped portion 177) provided on the front surface of the first protective member 31 (see FIG. 21).

Figure 19:
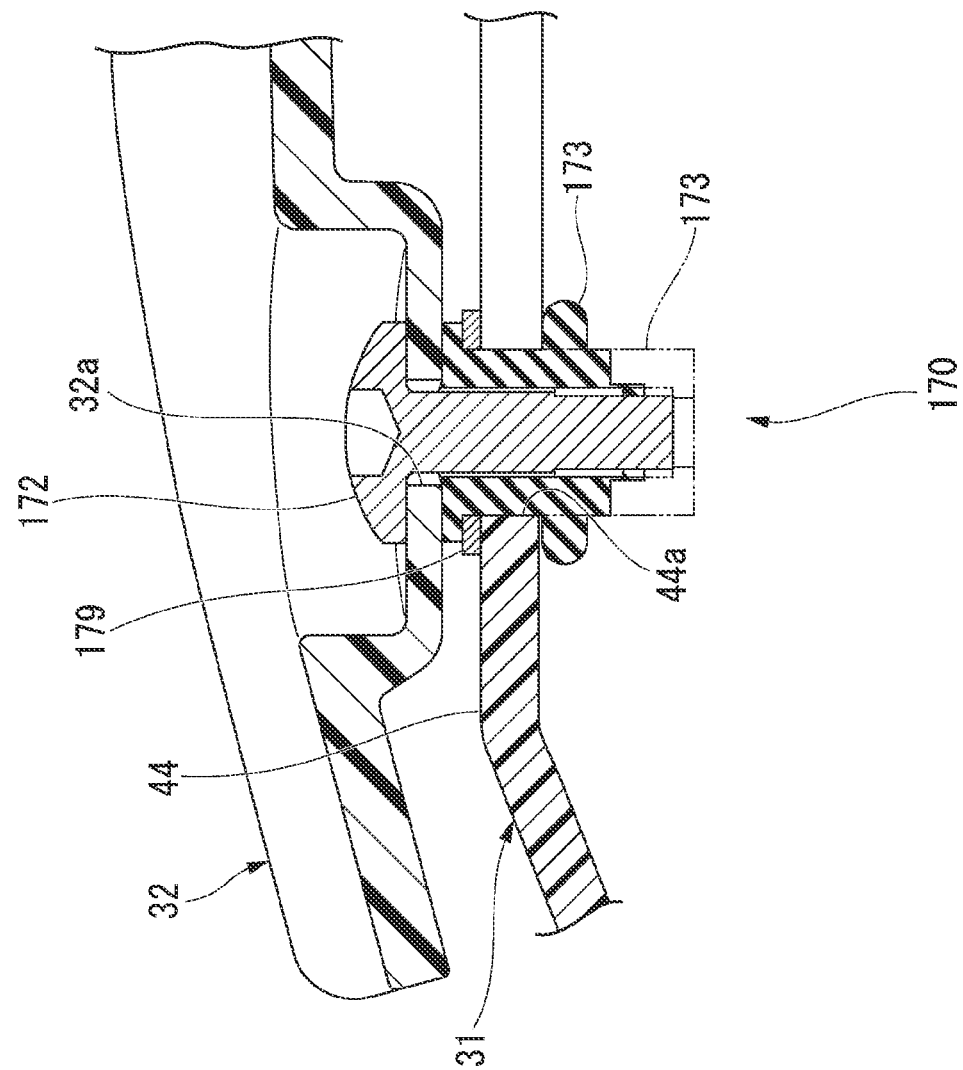
FIG. 19 is an enlarged view of a main part including a cross section of an opening adjusting structure of the knuckle guard according to the second embodiment.

As shown in FIG. 19, the elastic convex portion 173 has a cylindrical shape that protrudes rearward from the outward end portion of the second protective member 32 in the vehicle width direction. For example, the elastic convex portion 173 is a rubber blind nut. The elastic convex portion 173 is attached to the fourth extending portion 44 of the first protective member 31 with the fastening member 172 such as a bolt. The elastic convex portion 173 protrudes diagonally rearward and inward from the fourth extending portion 44 through the attachment hole 44a (see FIG. 23). The attachment hole 44a is provided in the outward portion (the fourth extending portion 44) of the first protective member 31 in the vehicle width direction.

As shown in FIG. 19, the elastic convex portion 173 is held in the attachment hole 44a from the front of the fourth extending portion 44. For example, by elastically deforming the elastic convex portion 173 by bolt-tightening work from one side (a front side of the vehicle), it is possible to fasten the first protective member 31 and the second protective member 32 to each other. In the drawing, the elastic convex portion 173 before elastic deformation is shown by a two-dot chain line, and the elastic convex portion 173 after elastic deformation is shown by a solid line.

Specifically, when the bolt 172 is tightened, a part of the elastic convex portion 173 (a portion on a shaft portion side of the bolt) is bent, and thus it is possible to fasten the first protective member 31 and the second protective member 32 to each other. By interposing the elastic convex portion 173 between the first protective member 31 and the second protective member 32, it is possible to obtain vibration isolation, insulation, and sealing effects. Reference sign 179 in the drawing indicates a washer provided between the first protective member 31 (the fourth extending portion 44) and the second protective member 32 (a portion of the elastic convex portion 173 on a bolt head side).

Figure 20:
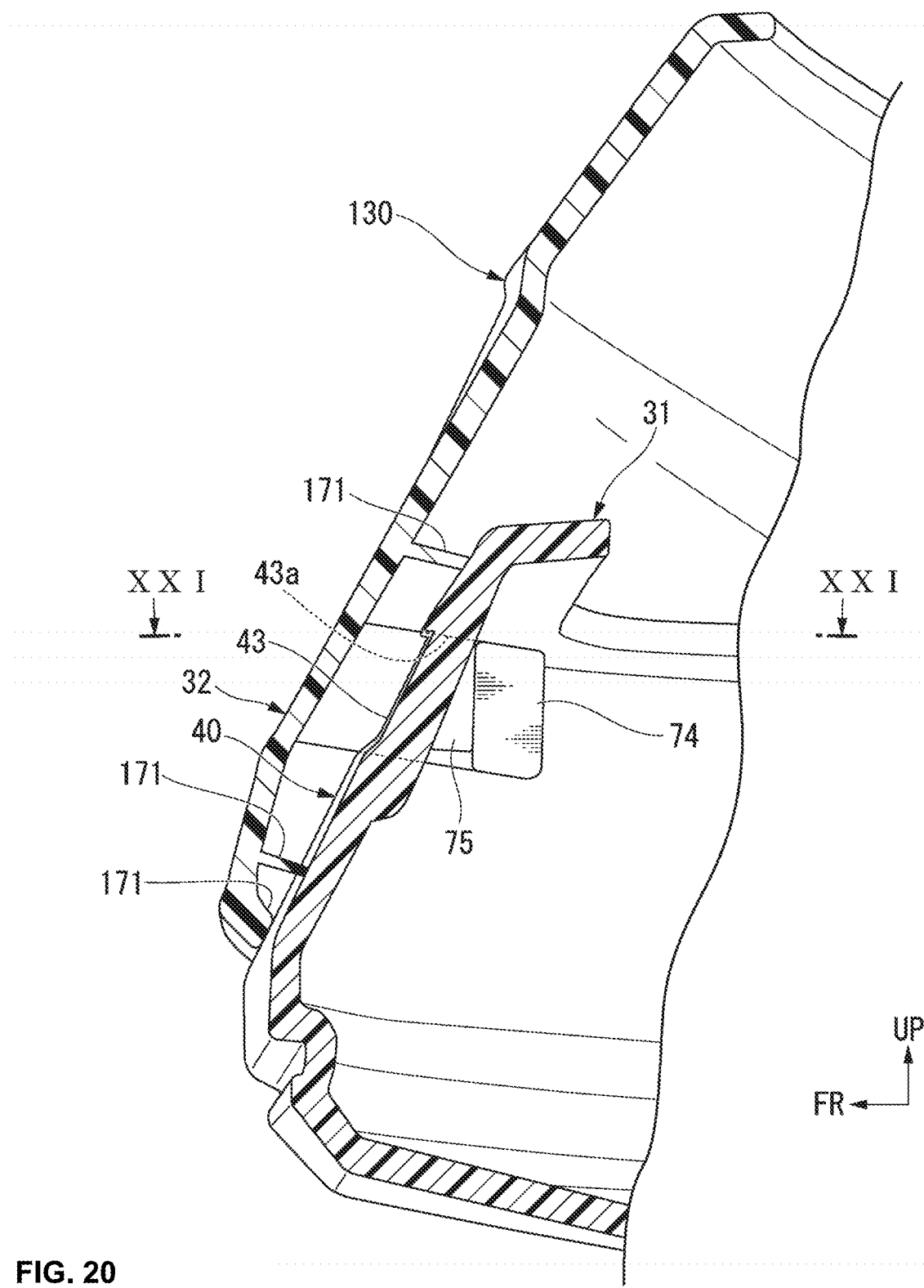
FIG. 20 is a view corresponding to FIG. 13, including a cross section of the knuckle guard according to the second embodiment.

As shown in FIG. 20, the windproof convex portion 171 protrudes rearward from the second protective member 32. The windproof convex portion 171 extends continuously in the vehicle width direction from the outward portion of the second protective member 32 in the vehicle width direction to the inward portion of the second protective member 32 in the vehicle width direction. For example, the windproof convex portion 171 is continuous from a portion (the outward portion in the vehicle width direction) of the second protective member 32 which faces the fourth extending portion 44 of the first protective member 31 to a portion (the inward portion in the vehicle width direction) of the second protective member 32 which faces the second extending portion 42.

As shown in FIG. 21, the first stepped portion 176 is provided on the front surface of the third extending portion 43 of the first protective member 31. The second stepped portion 177 is provided forward from the first stepped portion 176 on the front surface of the third extending portion 43 of the first protective member 31. The first stepped portion 176 and the second stepped portion 177 have a step shape.

Figure 22:
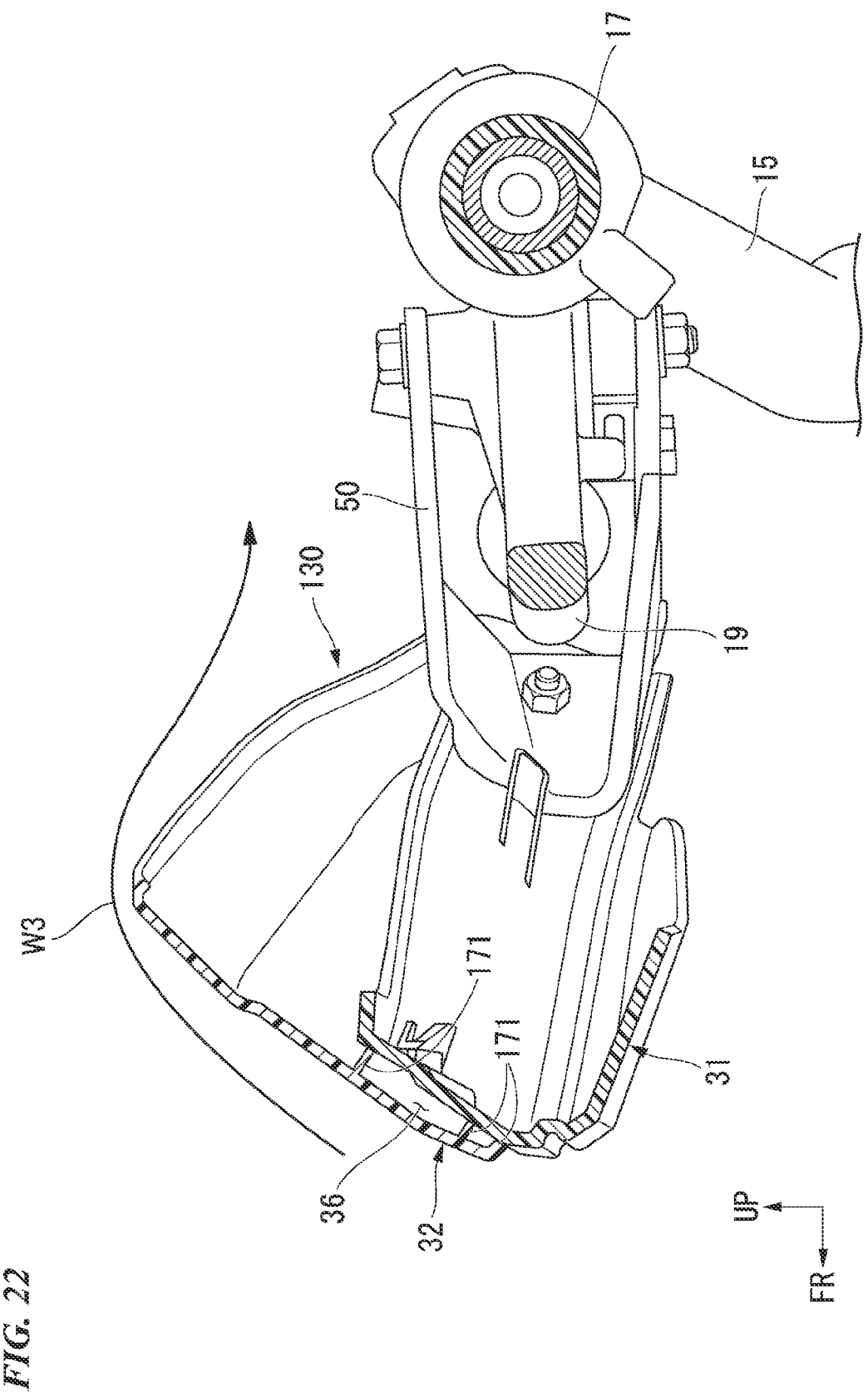
FIG. 22 is a view showing an operation of the knuckle guard according to the second embodiment.

An operation of a knuckle guard 130 according to the second embodiment will be described with reference to FIG. 22.

In the second embodiment, the windproof convex portion 171 comes into contact with the front surface of the first protective member 31 in a state in which the elastic convex portion 173 is located at the outward end portion of the attachment hole 44a in the vehicle width direction (an initial state), and thus the communication hole 36 is closed.

In the second embodiment, the traveling wind flows rearward and upward along the front surface of the second protective member 32 (see the arrow W3). In the second embodiment, the traveling wind does not enter the communication hole 36 from the opening lower end of the communication hole 36 unlike the first embodiment (see the arrow W2 in FIG. 15). The traveling wind flows rearward and upward along the front surface of the second protective member 32 and then enters the rear of the second protective member 32. In the second embodiment, it is possible to close the communication hole 36 in the initial state, and it is possible to prevent wind from passing through the communication hole 36, and thus it is possible to adjust the opening area of the communication hole 36 according to the preference and the situation.

An operation of the opening adjusting structure 170 according to the second embodiment will be described with reference to FIGS. 23 and 25.

In the opening adjusting structure 170, it is possible to adjust the opening area of the communication hole 36 by the second protective member 32 being bent inward in the vehicle width direction along the attachment hole 44a in the first protective member 31.

Figure 23:
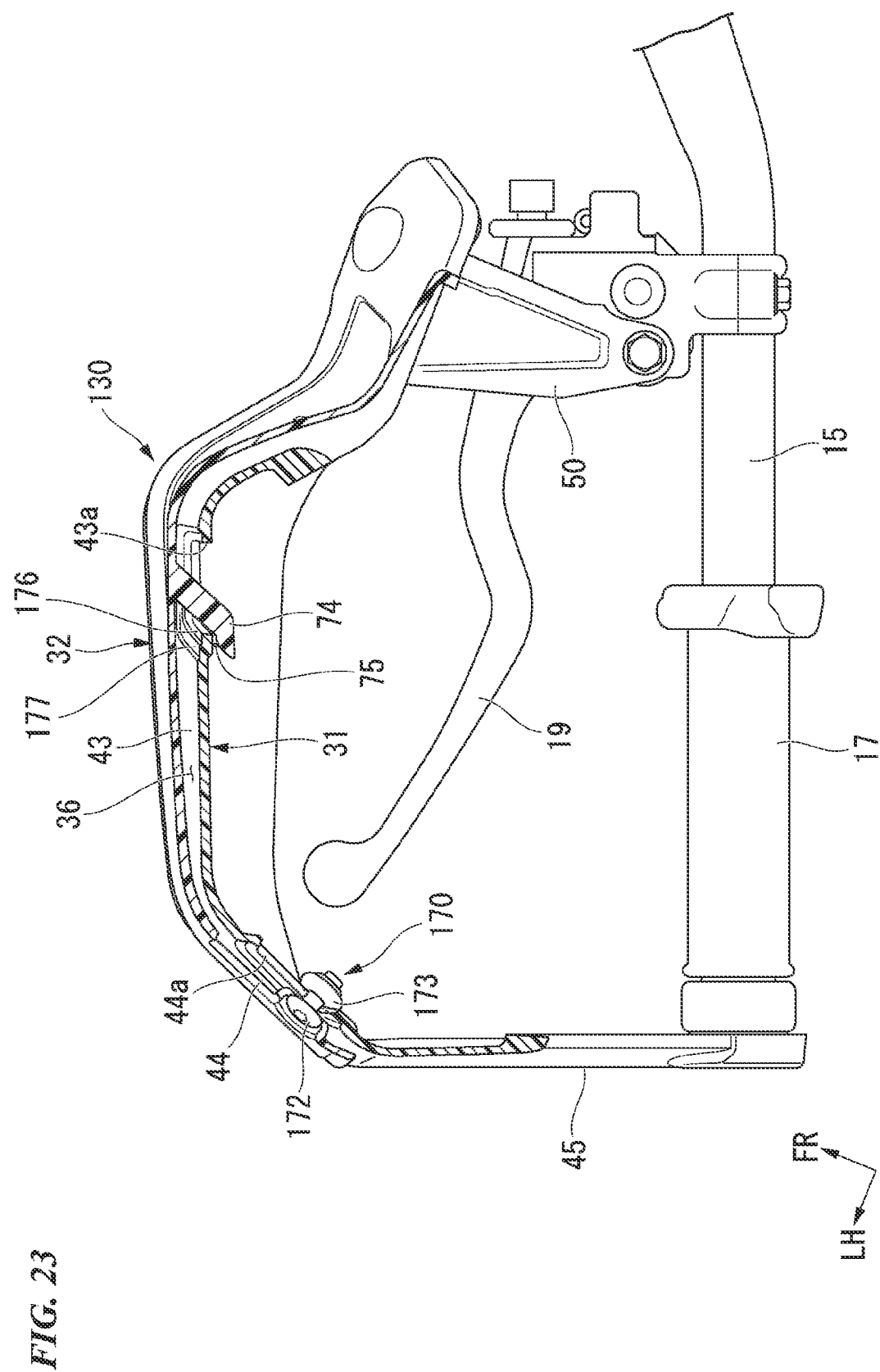
FIG. 23 is a view showing an operation of the opening adjusting structure according to the second embodiment.

FIG. 23 shows the initial state before the second protective member 32 is bent. In FIG. 23, the elastic convex portion 173 is elastically deformed by the bolt 172 inserted into the through hole 32a (see FIG. 19) in the outward portion of the second protective member 32 in the vehicle width direction. In the initial state, the elastic convex portion 173 is located at the outward end portion of the attachment hole 44a of the fourth extending portion 44 in the vehicle width direction. In the initial state, the engaging claw 74 engages with the engaging protrusion 75 at one edge of the insertion hole 43a of the third extending portion 43 in the vehicle width direction. In the initial state, the windproof convex portion 171 comes into contact with the front surface of the first protective member 31, and thus the communication hole 36 is closed (see FIG. 22).

Figure 24:
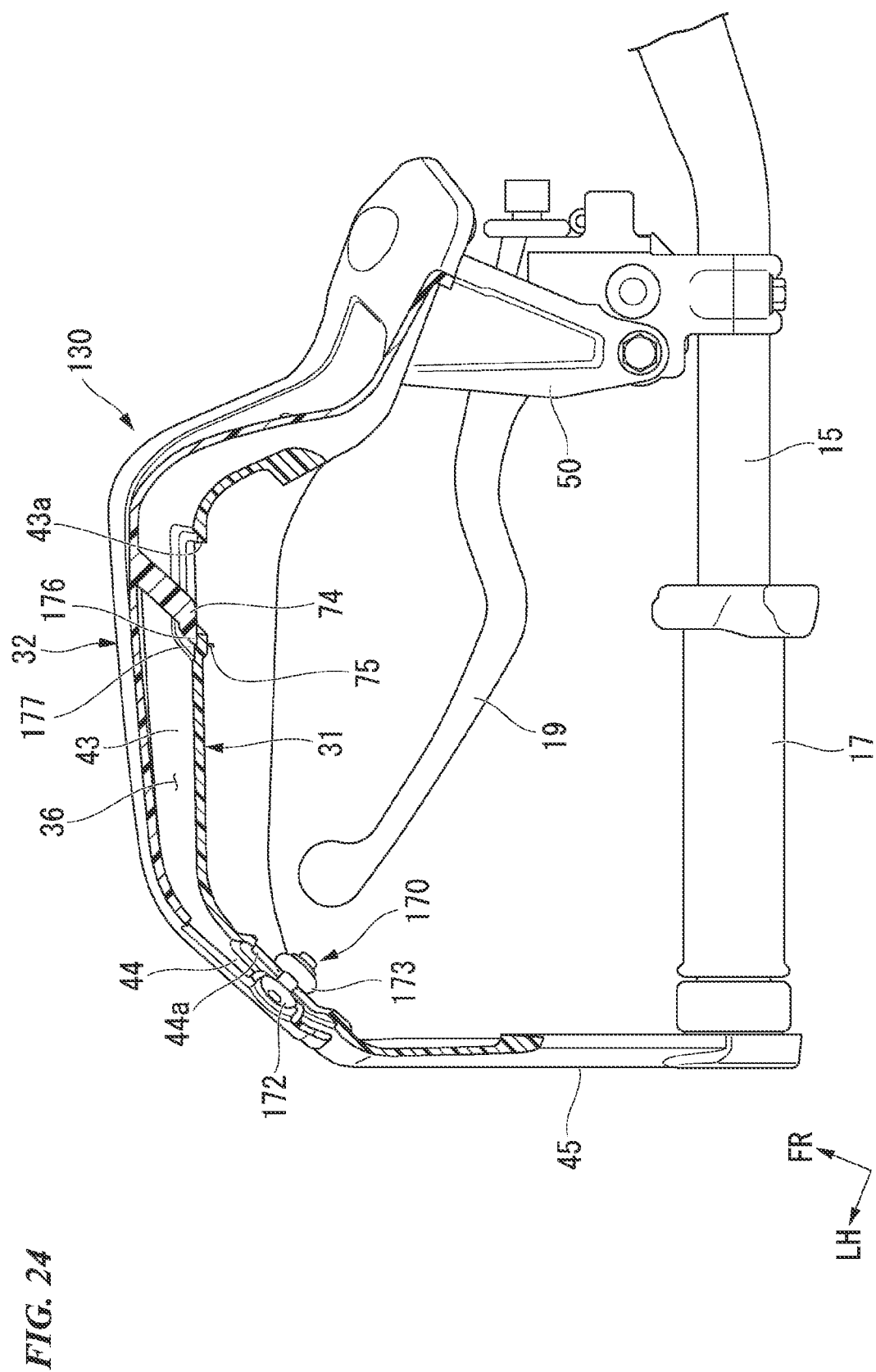
FIG. 24 is a view showing an operation of the opening adjusting structure following FIG. 23.

FIG. 24 shows a first curved state in which the second protective member 32 is bent to form a curved shape that projects forward. For example, in a state in which the inward portion of the second protective member 32 in the vehicle width direction is fastened, or in a state in which the elastic convex portion 173 is elastically deformed in the attachment hole 44a (for example, the initial state), when the outward portion of the second protective member 32 in the vehicle width direction is shifted inward in the vehicle width direction, the second protective member 32 is bent to have a curved shape that projects forward. In the first curved state, the elastic convex portion 173 is located at the central portion of the attachment hole 44a of the fourth extending portion 44 in the vehicle width direction. In the first curved state, the engaging claw 74 is in contact with the first stepped portion 176 on the front surface of the third extending portion 43 without engaging with the engaging protrusion 75. As a result, the communication hole 36 can be opened (enlarged) from the initial state of FIG. 23.

Figure 25:
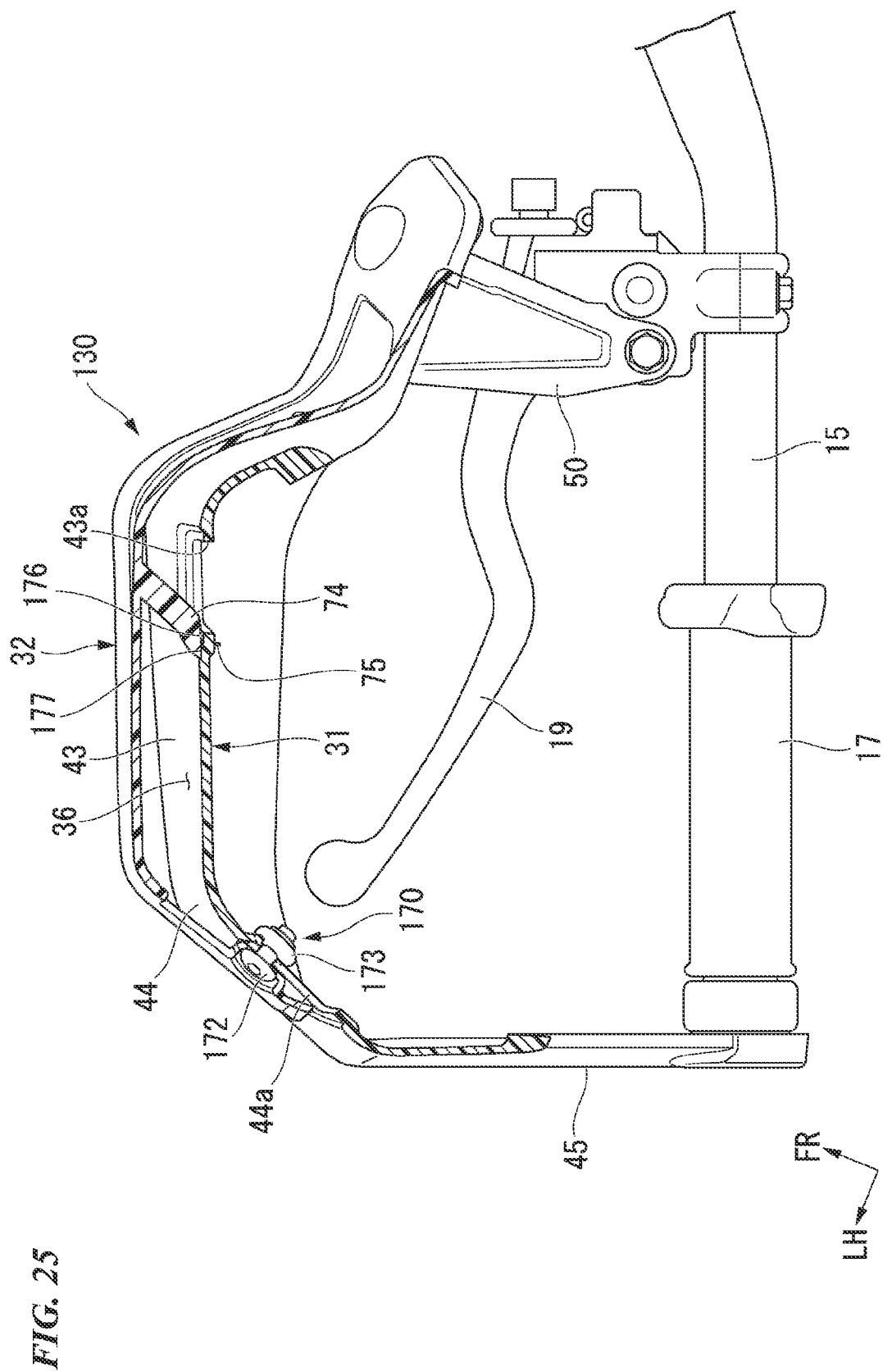
FIG. 25 is a view showing an operation of the opening adjusting structure following FIG. 24.

FIG. 25 shows a second curved state in which the second protective member 32 is bent to form a curved shape that projects forward from the first curved state. For example, in a state in which the inward portion of the second protective member 32 in the vehicle width direction is fastened, or in a state in which the elastic convex portion 173 is elastically deformed in the attachment hole 44a (for example, the first curved state), when the outward portion of the second protective member 32 in the vehicle width direction is shifted inward in the vehicle width direction, the second protective member 32 is further bent to have a curved shape that projects forward. In the second curved state, the elastic convex portion 173 is located at an inward end portion of the attachment hole 44a of the fourth extending portion 44 in the vehicle width direction. In the second curved state, the engaging claw 74 is in contact with the second stepped portion 177 on the front surface of the third extending portion 43 without engaging with the engaging protrusion 75. As a result, the communication hole 36 can be enlarged from the second curved state shown in FIG. 24. The engaging claw 74 does not necessarily have to come into contact with the second stepped portion 177. If the elastic convex portion 173 can be supported in the attachment hole 44a, the engaging claw 74 may be in a state separate from the second stepped portion 177.

As described above, the knuckle guard 130 in the second embodiment includes the opening adjusting structure 170 for adjusting the opening area of the communication hole 36, and the opening adjusting structure 170 includes the elastic convex portion 173 that protrudes rearward from the second protective member 32 and is elastically deformable, the attachment hole 44a that is an elongate hole provided on the first protective member 31 and having a length in the vehicle width direction and is for attaching the elastic convex portion 173, and the fastening member 172 that fastens the first protective member 31 and the second protective member 32 to each other by elastically deforming the elastic convex portion 173.

According to the present embodiment, when the second protective member 32 is bent inward in the vehicle width direction and is fixed to the inward side of the attachment hole 44a of the first protective member 31 in the vehicle width direction by the elastic convex portion 173 being elastically deformed, it is possible to enlarge the communication hole 36, and it is possible to increase the wind amount flowing rearward from the knuckle guard 130 through the communication hole 36. On the other hand, when the second protective member 32 is fixed to the outward side of the attachment hole 44a of the first protective member 31 in the vehicle width direction by the elastic convex portion 173 being elastically deformed, it is possible to reduce the communication hole 36, and it is possible to decrease the wind amount flowing rearward from the knuckle guard 130 through the communication hole 36. Therefore, it is easy to adjust the windproof range and the wind amount behind the knuckle guard 130 according to the rider's preference, in consideration of the traveling conditions such as the traveling speed and the air temperature (including the ambient temperature of the hands).

The opening adjusting structure 170 further includes the windproof convex portion 171 that is provided between the first protective member 31 and the second protective member 32 and blocks at least some of the wind that has entered the communication hole 36, and thus the following effects are exhibited.

According to this configuration, at least some of the wind that has entered the communication hole 36 is blocked by the windproof convex portion 171, and thus it is possible to reduce the wind amount flowing rearward from the knuckle guard 130 through the communication hole 36.

The attachment hole 44a is provided in the outward portion of the first protective member 31 in the vehicle width direction, and the windproof convex portion 171 protrudes rearward from the second protective member 32 and extends continuously in the vehicle width direction from the outward portion of the second protective member 32 in the vehicle width direction to the inward portion of the second protective member 32 in the vehicle width direction, and thus the following effects are exhibited.

According to this configuration, it is easy to reduce the wind amount flowing rearward from the knuckle guard 130 through the communication hole 36 as compared with the case in which the plurality of windproof convex portions 171 are disposed at intervals in the vehicle width direction. In addition, in a case in which the second protective member 32 is attachable to and detachable from the first protective member 31, it is possible to enhance the appearance of the first protective member 31 with the second protective member 32 removed from the first protective member 31 (when the knuckle guard 130 is used with only the first protective member 31) as compared with the configuration in which the windproof convex portion 171 protrudes forward from the first protective member 31.

In the opening adjusting structure 170, when the windproof convex portion 171 comes into contact with the front surface of the first protective member 31 in a state in which the elastic convex portion 173 is located at the outward end portion of the attachment hole 44a in the vehicle width direction, it is possible to close the communication hole 36, and thus the following effects are exhibited.

According to this configuration, when the second protective member 32 is fixed to the outward end portion of the attachment hole 44a of the first protective member 31 in the vehicle width direction by the elastic convex portion 173 being elastically deformed, it is possible to close the communication hole 36, and it is possible to prevent wind from passing through the communication hole 36. Therefore, it is possible to adjust the opening area of the communication hole according to the preference and the situation. In addition, by allowing the windproof convex portion 171 to come into contact with the front surface of the first protective member 31, it is possible to suppress rattling between the first protective member 31 and the second protective member 32.

The opening adjusting structure 170 further includes the engaging claw 74 having an L shape that extends diagonally rearward and outward from the rear surface of the second protective member 32, the insertion hole 43a that is an elongate hole provided in the first protective member 31 and having a length in the vehicle width direction and into which the engaging claw 74 can be inserted, the engaging protrusion 75 that is one edge of the insertion hole 43a and with which the engaging claw 74 can engage in the initial state before the second protective member 32 is bent, the first stepped portion 176 that is a stepped portion provided on the front surface of the first protective member 31 and with which the engaging claw 74 can come into contact in the first curved state in which the second protective member 32 is bent to form a curved shape that projects forward, and the second stepped portion 177 that is a stepped portion provided forward from the first step portion 176 on the front surface of the first protective member 31 and with which the engaging claw 74 can come into contact in the second curved state in which the second protective member 32 is bent to form a curved shape that projects forward from the first curved state, and thus the following effects are exhibited.

According to this configuration, it is possible to define a relative position between the first protective member 31 and the second protective member 32 in each of the initial state, the first curved state, and the second curved state of the second protective member 32. In addition, it is possible to adjust the wind amount flowing rearward from the knuckle guard 130 through the communication hole 36 in three stages of the initial state, the first curved state, and the second curved state of the second protective member 32.

Modification Examples of Second Embodiment

In the second embodiment, an example in which the windproof convex portion 171 protrudes rearward from the second protective member 32 has been described, but the present invention is not limited to this. For example, the windproof convex portion 171 may protrude forward from the first protective member 31. That is, the windproof convex portion 171 may be provided between the first protective member 31 and the second protective member 32.

In the second embodiment, an example in which the windproof convex portion 171 extends continuously in the vehicle width direction from the outward portion of the second protective member 32 in the vehicle width direction to the inward portion of the second protective member 32 in the vehicle width direction has been described, but the present invention is not limited to this. For example, a plurality of windproof convex portions 171 may be disposed at intervals in the vehicle width direction. For example, the windproof convex portion 171 may have a function of blocking at least some of the wind that has entered the communication hole 36.

In the second embodiment, an example in which the opening adjusting structure 170 includes two stepped portions 176 and 177 has been described, but the present invention is not limited to this. For example, the number of stepped portions may be only one or three or more.

Other Modification Examples

In the above-described embodiment, an example in which the communication hole 36 opens the entire stacked portion 37 in which the first protective member 31 and the second protective member 32 overlap in the front view, in the vertical direction has been described, but the present invention is not limited to this. For example, the communication hole 36 may open a part of the stacked portion 37 in the vertical direction. The communication hole 36 may open at least a part of the stacked portion 37 in the vertical direction.

In the above-described embodiment, an example in which the knuckle guard 30 has a divided structure, and the divided components (the first protective member 31 and the second protective member 32) are provided has been described, but the present invention is not limited to this. For example, the knuckle guard 30 may not have a divided structure and may include only one protective member.

In the above-described embodiment, an example in which the second protective member 32 is attachable to and detachable from the first protective member 31 has been described, but the present invention is not limited to this. For example, the second protective member 32 may be integrated with the first protective member 31 not to be detachable from the first protective member 31.

In the above-described embodiment, an example in which the front protective portion 40 and the lateral protective portion 45 are integrally formed of the same member has been described, but the present invention is not limited to this. For example, the front protective portion 40 and the lateral protective portion 45 may be formed of different members. For example, the lateral protective portion 45 may be fastened to the front protective portion 40 with a bolt or the like.

In the above-described embodiment, an example in which the handlebar 15 to which the knuckle guard 30 is attached is used as a bar handle has been described, but the present invention is not limited to this. For example, the handlebar 15 to which the knuckle guard 30 is attached may be a so-called separate handlebar of which the left and the right are separated from each other. For example, in a separate handlebar having a base portion fixed to the top bridge 5 and a pipe-shaped portion extending in the vehicle width direction, the knuckle guard 30 may be attached after the weight is inserted into the pipe-shaped portion.

The present invention is not limited to the above-described embodiment, and the saddle-ride type vehicle includes all vehicles in which a driver straddles the vehicle body, including a motorcycle (including a motorized bicycle or a scooter type vehicle) as well as a three-wheeled vehicle (including a vehicle having one front wheel and two rear wheels as well as a vehicle having two front wheels and one rear wheel) or a four-wheeled vehicle.

The configurations in the above-described embodiments are examples of the present invention, and various modifications such as replacing the components of the embodiments with known components can be made without departing from the scope of the present invention.

BRIEF DESCRIPTION OF THE REFERENCE SYMBOLS

1 Motorcycle (saddle-ride type vehicle, vehicle)
15 Handlebar
17 Grip
30, 130 Knuckle guard
31 First protective member
32 Second protective member
35 Wind guide portion
36 Communication hole
37 Stacked portion
39 Guard member
43a Insertion hole
44a Attachment hole
50 Connecting member
74 Engaging claw (positioning portion)
75 Engaging protrusion
76 Stepped portion
170 Opening adjusting structure
171 Windproof convex portion
172 Fastening member
173 Elastic convex portion
176 First stepped portion
177 Second stepped portion

What is claimed is:

1. A knuckle guard comprising:
a wind guide portion that is disposed in front of a grip of a handlebar of a vehicle and has a communication hole which opens to in a vertical direction,
wherein the knuckle guard includes
a first protective member disposed in front of the grip, and
a second protective member disposed in front of the first protective member,
wherein the second protective member which is a part of the wind guide portion covers the communication hole in a front view,
wherein the first protective member and the second protective member form a stacked portion in which the protective members overlap each other, and
wherein the communication hole opens to at least a part of the stacked portion in the vertical direction,
wherein the first protective member has an attachment hole for attaching the second protective member
wherein the attachment hole is an elongated hole having a length in a vehicle width direction, and
wherein the second protective member can enlarge the communication hole by being bent inward in the vehicle width direction along the attachment hole.

2. The knuckle guard according to claim 1,
wherein the first protective member has an insertion hole which is an elongated hole having a length in the vehicle width direction, and
wherein a positioning portion that defines a position in the insertion hole is provided between the first protective member and the second protective member.

3. The knuckle guard according to claim 2,
wherein the second protective member is provided with an engaging claw as the positioning portion which can be inserted into the insertion hole of the first protective member,
wherein the engaging claw has an L shape that extends diagonally rearward and outward from a rear surface of the second protective member,
wherein, in an initial state before the second protective member is bent, the engaging claw engages with an opening edge portion of the insertion hole of the first protective member, and
wherein, in a state in which the second protective member is bent to form a curved shape that projects forward, the engaging claw comes into contact with a stepped portion on a front surface of the first protective member.

4. The knuckle guard according to claim 1, wherein the second protective member is attachable to and detachable from the first protective member.

5. The knuckle guard according to claim 1, further comprising:
an opening adjusting structure for adjusting an opening area of the communication hole,
wherein the opening adjusting structure includes
an elastic convex portion that protrudes rearward from the second protective member and is elastically deformable,
the attachment hole provided on the first protective member is for attaching the elastic convex portion, and
a fastening member that fastens the first protective member and the second protective member to each other by elastically deforming the elastic convex portion.

6. The knuckle guard according to claim 5, wherein the opening adjusting structure further includes a windproof convex portion that is provided between the first protective member and the second protective member and blocks at least some of the wind that has entered the communication hole.

7. The knuckle guard according to claim 6,
wherein the attachment hole is provided in an outward portion of the first protective member in a vehicle width direction, and
wherein the windproof convex portion protrudes rearward from the second protective member and extends continuously in the vehicle width direction from an outward portion of the second protective member in the vehicle width direction to an inward portion of the second protective member in the vehicle width direction.

8. The knuckle guard according to claim 7, wherein, in the opening adjusting structure, when the windproof convex portion comes into contact with a front surface of the first protective member in a state in which the elastic convex portion is located at an outward end portion of the attachment hole in the vehicle width direction, the communication hole can be closed.

9. The knuckle guard according to claim 5,
wherein the opening adjusting structure further includes
the engaging claw having an L shape that extends diagonally rearward and outward from a rear surface of the second protective member,
an insertion hole that is an elongate hole provided in the first protective member and having a length in the vehicle width direction and into which the engaging claw can be inserted,
an engaging protrusion that is one edge of the insertion hole and with which the engaging claw can engage in an initial state before the second protective member is bent,
a first stepped portion that is a stepped portion provided on a front surface of the first protective member and with which the engaging claw can come into contact in a first curved state in which the second protective member is bent to form a curved shape that projects forward, and
a second stepped portion that is a stepped portion provided forward from the first step portion on the front surface of the first protective member and with which the engaging claw can come into contact in a second curved state in which the second protective member is bent to form a curved shape that projects forward from the first curved state.

* * * * *